(12) United States Patent
Kim et al.

(10) Patent No.: US 9,762,301 B2
(45) Date of Patent: Sep. 12, 2017

(54) BASE STATION AND TERMINAL FOR DISTRIBUTED ARRAY MASSIVE MULTIPLE-INPUT AND MULTIPLE-OUTPUT (MIMO) COMMUNICATION ANTENNA SYSTEM

(71) Applicant: ELECTRONICS AND TELECOMMUNICATIONS RESEARCH INSTITUTE, Daejeon (KR)

(72) Inventors: Seong Rag Kim, Daejeon (KR); Hee Soo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/808,662

(22) Filed: Jul. 24, 2015

(65) Prior Publication Data

US 2017/0026093 A1    Jan. 26, 2017

(51) Int. Cl.
| | |
|---|---|
| *H04M 1/00* | (2006.01) |
| *H04B 7/0452* | (2017.01) |
| *H04B 7/06* | (2006.01) |
| *H04B 7/022* | (2017.01) |
| *H04B 7/08* | (2006.01) |
| *H04W 88/08* | (2009.01) |
| *H04W 88/02* | (2009.01) |

(52) U.S. Cl.
CPC ........... *H04B 7/0452* (2013.01); *H04B 7/022* (2013.01); *H04B 7/0695* (2013.01); *H04B 7/086* (2013.01); *H04W 88/02* (2013.01); *H04W 88/085* (2013.01)

(58) Field of Classification Search
CPC .................................................... H04B 7/0452
USPC ....................................................... 455/562.1
See application file for complete search history.

(56) References Cited

U.S. PATENT DOCUMENTS

| | | | | |
|---|---|---|---|---|
| 7,627,250 B2 * | 12/2009 | George | ............ | H04B 10/25759 398/115 |
| 7,848,654 B2 * | 12/2010 | Sauer | ..................... | H04B 7/022 370/352 |
| 2011/0206158 A1 | 8/2011 | Kim et al. | | |

FOREIGN PATENT DOCUMENTS

KR    10-2013-0097117 A    9/2013

OTHER PUBLICATIONS

Thomas L. Marzetta, "Noncooperative Cellular Wireless with Unlimited Numbers of Base Station Antennas", IEEE Transactions on Wireless Communications, Nov. 2010, pp. 3590-3600, vol. 9, No. 11, IEEE.

* cited by examiner

*Primary Examiner* — Sanh Phu

(57) ABSTRACT

Disclosed are a terminal and a base station for a distributed array massive multiple-input and multiple-output (MIMO) communication antenna system and an operation method thereof, wherein the terminal includes a distribution analog unit receiving a plurality of analog array receive signals based on a terminal antenna transmit signal from a virtual terminal through a plurality of distributed antenna arrays and a digital unit restoring the terminal antenna transmit signal based on the analog array receive signals and a channel parameter, and the base station includes an antenna receiving an analog receive signal based on a transmit beamforming input signal from a plurality of distributed antenna arrays, a virtual terminal restoring the transmit beamforming input signal based on an amplitude of the analog receive signal, and a terminal receive signal mapper mapping the transmit beamforming input signal to a base station transmit signal.

17 Claims, 16 Drawing Sheets

BASE STATION AND TERMINAL FOR DISTRIBUTED ARRAY MASSIVE MULTIPLE-INPUT AND MULTIPLE-OUTPUT (MIMO) COMMUNICATION ANTENNA SYSTEM

BACKGROUND

1. Field of the Invention

Example embodiments relate to a base station and a terminal for a distributed array massive multiple-input and multiple-output (MIMO) communication system capable of efficiently dealing with drastically increasing wireless traffic due to a plurality of terminals at high data speed in a mobile communication environment using a high-frequency band such as a millimeter-wave band and a operation method of the distributed array massive MIMO communication system.

2. Description of the Related Art

With development of novel technology for high-quality multimedia services, wireless traffic increases explosively every year, and accordingly studies on fifth-generation (5G) mobile communications to efficiently cope with increase in wireless traffic are carried out vigorously.

As a method for dealing with drastically increasing wireless traffic, there is suggested a technique of extending an available frequency band by securing a wider frequency band using a high-frequency band, such as a millimeter-wave band, since a cellular band currently used for mobile communications is already saturated.

However, as a higher frequency band is used, fewer scattering components are present, line-of-sight (LOS) components are relatively greater and penetration loss by an obstacle, such as a building, may be massive. Thus, if a fine channel, for example, an LOS channel, is not secured, coverage holes or poor reception areas may be formed, disabling normal mobile communication services.

SUMMARY

An aspect according to an example embodiment is to solve an issue, for example, a coverage hole and a shadow area, which may occur in communication performed in a high-frequency band including a millimeter-wave band.

Another aspect according to an example embodiment is to enhance a diversity gain and an interference cancellation capability in an antenna system.

Still another aspect according to an example embodiment is to reduce an amount of wireless resources and power consumption increase in an antenna system.

According to an aspect, there is provided a base station including a distribution analog unit to receive a plurality of analog array receive signals based on a terminal antenna transmit signal from a virtual terminal through a plurality of distributed antenna arrays, and a digital unit to restore the terminal antenna transmit signal based on the plurality of analog array receive signals and a channel parameter, wherein the channel parameter is information on a plurality of channels between the virtual terminal and each of the distributed antenna arrays.

The distribution analog unit may include a wired linker to deliver the analog array receive signals through a radio frequency (RF) fiber-optic cable to the digital unit, and a number of RF fiber-optic cables may be determined based on positions of the plurality of distributed antenna arrays.

The digital unit may include an analog-to-digital (A/D) converter to convert the analog array receive signals into digital array receive signals, a receive signal divider to divide the digital array receive signals to be pilot receive signals and data receive signals, a channel estimator to generate a channel estimation vector for the plurality of channels based on the pilot receive signals, an array selector to generate an array selection index vector related to a quality of the plurality of channels based on the channel estimation vector, and a receive beamformer to restore the terminal antenna transmit signal based on the data receive signals, the channel estimation vector, and the array selection index vector.

The array selector may compare the channel estimation vector to a channel quality threshold to generate the array selection index vector.

The receive beamformer may include a received power adjuster to perform an operation to obtain a received power adjustment coefficient for the virtual terminal based on the array selection index vector and the channel estimation vector, and a selective maximal ratio combining (MRC) beamformer to restore the terminal antenna transmit signal based on a selective MRC beamforming scheme using the data receive signals, the received power adjustment coefficient, the channel estimation vector, and the array selection index vector.

The receive beamformer may select an antenna array used to restore the terminal antenna transmit signal from the plurality of distributed antenna arrays based on the array selection index vector, and a terminal-oriented virtual cell of the virtual terminal may be configured based on the selected antenna array.

The virtual terminal may correspond to one of a plurality of antennas of a terminal.

The digital unit may include a base station receive signal mapper to map the restored terminal antenna transmit signal to a terminal transmit signal, and the terminal transmit signal may be a signal to be transmitted from the terminal through an uplink to the base station.

The distribution analog unit may receive the plurality of analog array receive signals in a millimeter-wave (mm-Wave) band.

According to another aspect, there is also provided a base station including a digital unit to generate a transmit beamforming input signal to be transmitted to a virtual terminal and generate a plurality of analog array transmit signals based on the transmit beamforming input signal and a channel parameter, and a distribution analog unit to transmit the plurality of analog array transmit signals through a plurality of distributed antenna arrays, wherein the channel parameter is information on a plurality of channels between the virtual terminal and each of the distributed antenna arrays.

The distribution analog unit may include a wired linker to receive the analog array transmit signals through an RF fiber-optic cable from the digital unit, and a number of RF fiber-optic cables may be determined based on positions of the plurality of distributed antenna arrays.

The digital unit may include a channel estimator to generate a channel estimation vector for the plurality of channels, an array selector to generate an array selection index vector related to a quality of the plurality of channels based on the channel estimation vector, a transmit beamformer to generate digital array transmit signals based on the transmit beamforming input signal, the channel estimation vector, and the array selection index vector, and a digital-to-analog (D/A) converter to convert the digital array transmit signals into the analog array transmit signals.

The array selector may compare the channel estimation vector to a channel quality threshold to generate the array selection index vector.

The transmit beamformer may include a transmitted power adjuster to perform an operation to obtain a transmitted power adjustment coefficient for the virtual terminal based on the array selection index vector and the channel estimation vector, and a selective MRC beamformer to generate the digital array transmit signals based on a selective MRC beamforming scheme using the transmit beamforming input signal, the transmitted power adjustment coefficient, the channel estimation vector, and the array selection index vector.

The transmit beamformer may select an antenna array used to transmit the transmit beamforming input signal from the plurality of distributed antenna arrays based on the array selection index vector, and a terminal-oriented virtual cell of the virtual terminal may be configured based on the selected antenna array.

The digital unit may include a base station transmit signal mapper to map a base station transmit signal to the transmit beamformer input signal, and the base station transmit signal may be a signal to be transmitted from the base station through a downlink to the terminal.

The distribution analog unit may transmit the plurality of analog array transmit signals in an mmWave band.

According to still another aspect, there is also provided a terminal including an antenna to receive an analog receive signal based on a transmit beamforming input signal from a plurality of distributed antenna arrays, a virtual terminal to restore the transmit beamforming input signal based on an amplitude of the analog receive signal, and a terminal receive signal mapper to map the transmit beamforming input signal to a base station transmit signal, wherein the base station transmit signal is generated to be transmitted from a base station through a downlink to the terminal.

The virtual terminal may include an A/D converter to convert the analog receive signal into a digital receive signal, a receive signal divider to divide the digital receive signal into a data receive signal and a pilot receive signal, a receive signal amplitude estimator to estimate the amplitude of the analog receive signal based on the pilot receive signal, and a data signal restorer to restore the transmit beamforming input signal based on the amplitude of the analog receive signal and the data receive signal.

ADVANTAGEOUS EFFECTS

According to an example embodiment, it is possible to obtain a diversity gain in a high-frequency band including a millimeter-wave band through a base station including a distribution analog unit and a digital unit using distributed array antennas so as to solve an issue of a coverage hole and a shadow area.

According to another example embodiment, it is possible to reduce costs of a wired link such as a fiber-optic cable in an antenna system and improve an interference cancellation capability.

According to still another example embodiment, it is possible to provide a terminal-oriented virtual cell based on a selective beamforming of a distributed antenna array.

BRIEF DESCRIPTION OF THE DRAWINGS

These and/or other aspects, features, and advantages of this disclosure will become apparent and more readily appreciated from the following description of example embodiments, taken in conjunction with the accompanying drawings of which.

DETAILED DESCRIPTION

Figure 1:
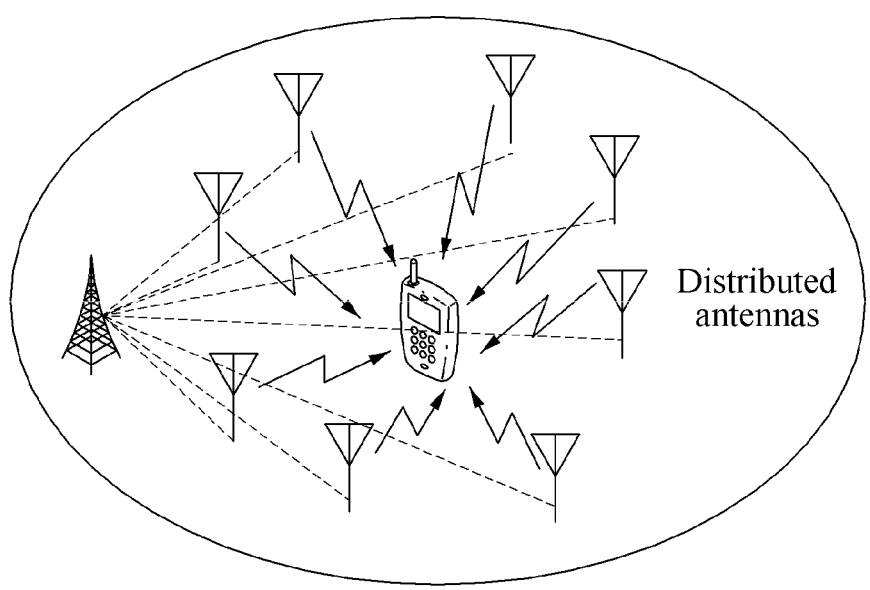
FIG. 1 illustrates an example of a distributed antenna system (DAS)

Hereinafter, an apparatus and a method for updating an application program according to example embodiments will be described in detail with reference to the accompanying drawings. The present disclosure, however, is not limited or restricted by the example embodiments. Like reference numerals refer to like elements throughout.

A distributed array massive multiple-input and multiple-output (MIMO) communication antenna system may perform forward and backward beamformings according to time division duplexing (TDD). Hereinafter, the distributed array massive MIMO communication antenna system may also referred to as a DAMMS.

Thus, it is required to increase diversity gain by securing as many line-of-sight (LOS) channels as possible. To increase diversity gain, a distributed antenna system (DAS) for separating base station antennas in different places is generally used.

FIG. 1 illustrates an example of a DAS.

In the DAS of FIG. 1, a terminal is capable of communicating with a base station through a base station antenna adjacent to the terminal, and thus a radio distance between the base station antenna and the terminal is reduced to improve transmission efficiency. Also, since the DAS enables the terminal to communicate with base station antennas positioned in different directions, the terminal is capable of communicating via one path when another path is blocked. Accordingly, occurrence of coverage holes or poor reception areas, for example, a shadow area, may be effectively reduced.

However, in the DAS, since the base station and each base station antenna are connected via a radio frequency (RF) fiber-optic cable, a growing number of base station antennas may lead to increase in installation and maintenance costs of RF fiber-optic cables. Also, in the DAS, the base station requires feedback information from a terminal so as to select a base station antenna adjacent to the terminal and to communication with the terminal through the selected base station antenna, so that a high-speed mobile communication service may be impossible.

As another method for dealing with drastically increasing wireless traffic, a small cell technology which increases the number of base stations per unit area to linearly increase system capacity to the number of base stations is proposed.

In use of the small cell technology, however, when a cell radius is reduced, frequency of handovers grows, thus complicating mobility management and increasing interference between cells. Also, installation and management costs may increase with the number of base stations growing.

Accordingly, a remote radio head (RRH) is used to provide advantages of the small cell technology but to reduce costs.

Figure 2:
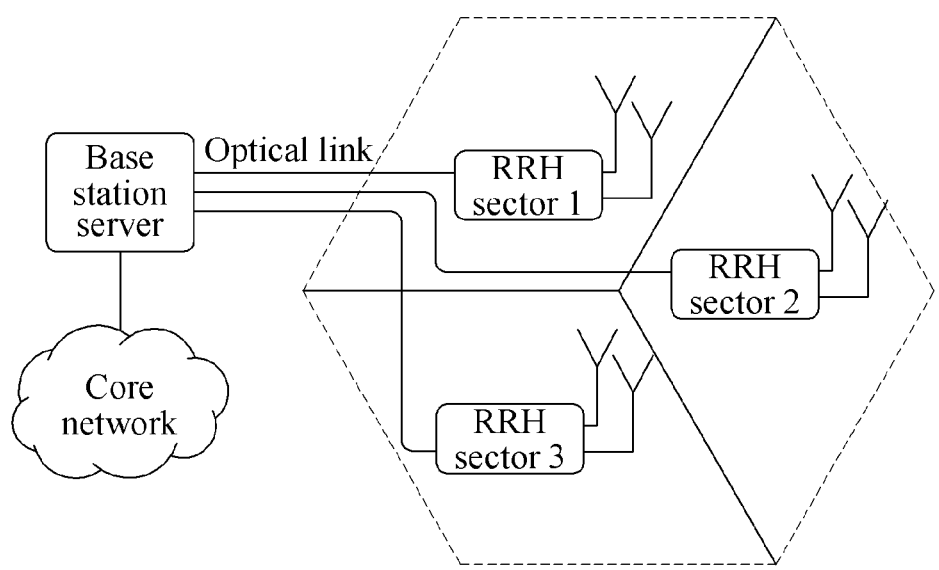
FIG. 2 illustrates an example of a remote radio head (RRH)

FIG. 2 illustrates an example of a RRH.

In the RRH of FIG. 2, a digital unit is disposed in a base station and an analog unit connected to the digital unit via a fiber-optic cable and a plurality of base station antennas are disposed in a service area, thereby saving cost.

As described above, when a spectrum is extended by using a high-frequency band, receive power is in inverse proportion to square of a frequency by the Friis transmission equation, and thus beamforming technology is required to maintain the same level of receive power in the high-frequency band.

For example, a 40×40 two-dimensional (2D) array is required in a 30 GHz band to maintain the same performance as that of a 4×4 2D array communicating in a 3 GHz band. Accordingly, although the number of antennas per array increases 100 times, antenna aperture areas actually occupied by the arrays are the same, and thus receive powers may be the same.

That is, as a large number of base station antennas are needed to maintain the same receive power, that is, to maintain normal communication quality, in a high-frequency band including a millimeter-wave band, a base station may have a massive MIMO communication structure including a great quantity of base station antennas.

In the massive MIMO communication structure, array gain may increase infinitely in proportion to the number of base station antennas, all terminals are capable of communicating separately without interference by one another so that spatial multiplexing gain may increase infinitely, and interference between users may be readily removed. In addition, matrix inversion for beamforming for the base station is not required to reduce system complexity, a terminal needs a simple single-input and single-output (SISO) receiver to make it possible to realize a low-power green radio, and three-dimensional (3D) beamforming is possible.

Figure 3A:
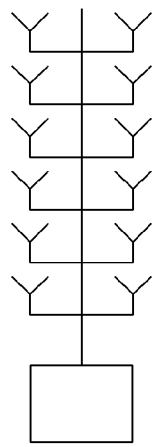
FIGS. 3A through 3C illustrate examples of arranging base station antennas in a massive multiple-input and multiple-output (MIMO) communication system.
Figure 3B:
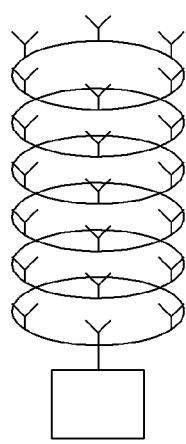
Figure 3C:
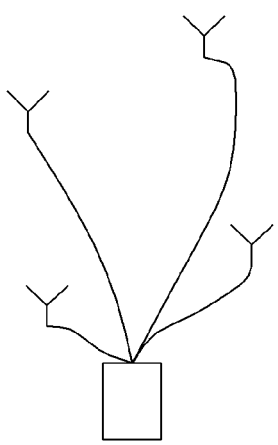

FIGS. 3A through 3C illustrate examples of arranging base station antennas in a massive MIMO communication system.

Referring to FIGS. 3A through 3C, the massive MIMO communication system may dispose base station antennas using at least one of a 2D square array, a ring array and a distributed antenna array.

FIG. 3A illustrates an example of the square array and FIG. 3B illustrates an example of the ring array.

When base station antennas are disposed using the ring array in the massive MIMO communication system, a relatively large number of base station antennas may be disposed as compared to the 2D square array since the ring array is a 3D array.

FIG. 3C illustrates an example of the distributed antenna array. Here, a massive MIMO communication system using the distributed antenna array for disposing base station antennas may be defined as a distributed massive MIMO communication system.

The 2D square array and the ring array have a centralized structure in which all base station antennas are present in a base station. Thus, when a massive MIMO communication system using the 2D square array or ring array employs a millimeter-wave channel with less scattering and strong LOS components or a high-frequency band for communications, diversity gain may be reduced.

On the contrary, since the distributed antenna array has a distributed structure in which base station antennas are distributed, a massive MIMO communication system using the distributed antenna array may secure relatively high diversity gain in a high-frequency band including a millimeter-wave channel.

The distributed massive MIMO communication system has advantages of both a DAS and a massive MIMO communication structure and thus may obtain array gain, diversity gain and multiplexing gain simultaneously in various radio channel environments including an LOS channel.

However, in order to have characteristics of an ideal massive MIMO communication structure, the distributed massive MIMO communication system needs a considerably large number of base station antennas, in which high costs are involved in connecting the base station and base station antennas via cable links, making it difficult to commercialize the distributed massive MIMO communication system.

Figure 4:
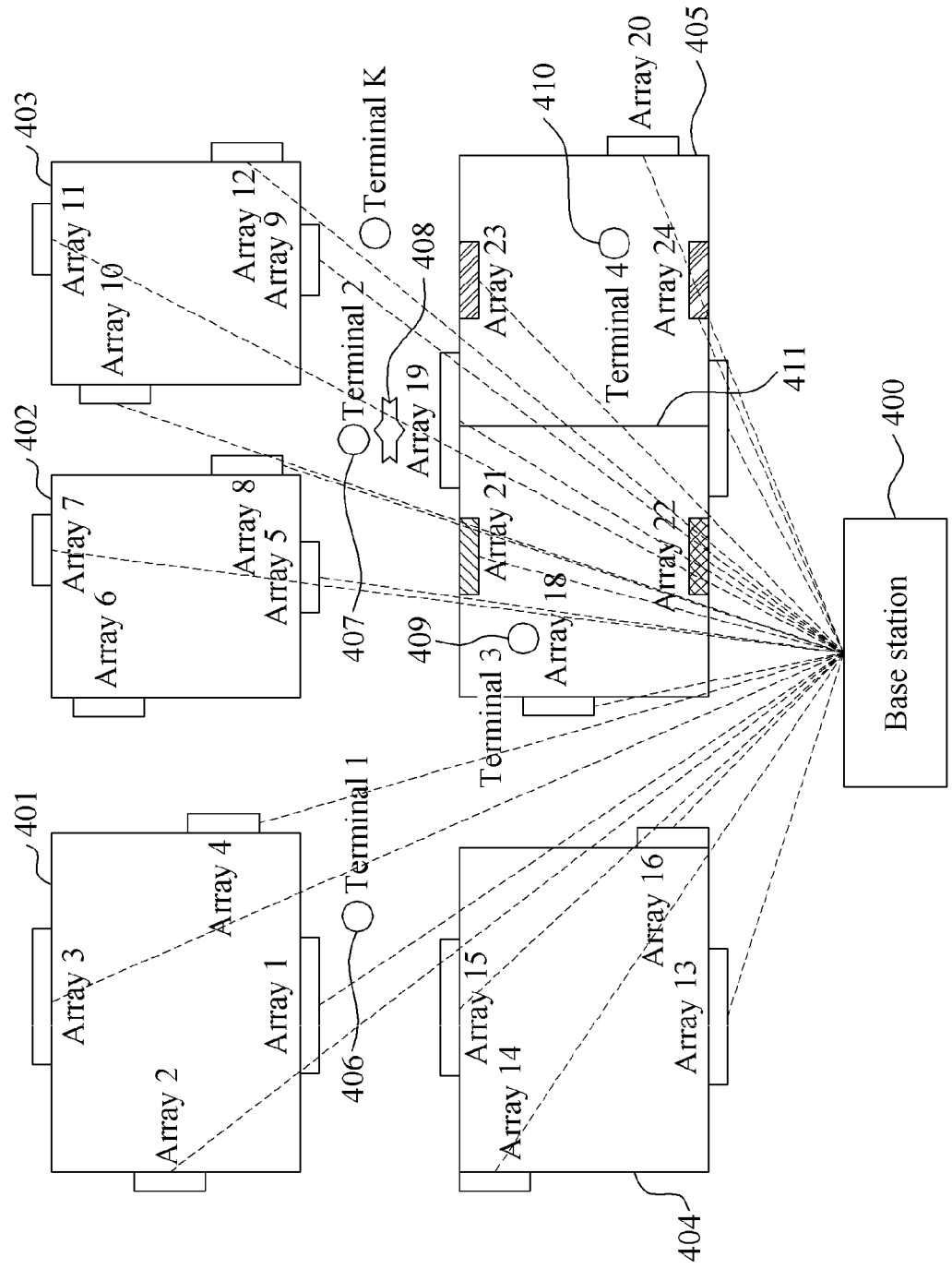
FIG. 4 illustrates an example of arranging distributed array antennas in a distributed array massive MIMO communication antenna system.

FIG. 4 illustrates an example of arranging distributed array antennas in a DAMMS.

Referring to FIG. 4, the DAMMS may arrange distributed array antennas including a plurality of array antennas, arrays 1 through 20, in a distributed manner, instead of distributed antennas. Here, in each array antenna, a base station antenna may be disposed based on, for example, the distributed antenna arrangement as described with reference to FIG. 3.

FIG. 4 illustrates an example in which the arrays 1 through 20 are disposed outside buildings 401 through 405 and arrays 21 through 24 are distributed in the building 405.

The DAMMS secures communications using an array antenna adjacent to each terminal to enhance spectral efficiency. That is, a terminal 1 406 may communicate with the arrays 1, 5, 9, 15, 18 and 19 via LOS channels and communicate with remaining arrays through non-line-of-sight (NLOS) channels. As compared with a centralized massive MIMO communication system with all antennas concentrated at a position of the array 19, the DAMMS enables the terminal 1 406 to communicate via the array 1 or the array 15 disposed in a shorter distance than the array 19, thereby improving spectral efficiency.

Moreover, the DAMMS may secure greater diversity gain than the centralized massive MIMO communication system. Although the terminal 2 407 is closest to the array 19, an LOS channel is blocked by an intermediate an obstacle 408, and thus a centralized massive MIMO communication system with the array 19 only may have drastic deterioration in communication quality. In the DAMMS, however, the terminal 2 407 is able to perform LOS communications through the arrays 1, 5, 8, 9, 10 and 15 disposed close to the terminal 2 407 in addition to the array 19 to secure sufficient diversity gain in a millimeter-wave band particularly with a strong LOS component, thus enabling a service without drastic deterioration in communication quality.

When a terminal 3 409 and a terminal 4 410 are positioned respectively in two rooms separated by a partition 411 in the building 405, a considerable quantity of signals may penetrate the partition 411 since penetration loss by the partition 411 is generally less than penetration loss by an outer wall of the building. Accordingly, the terminal 3 409 is able to communicate not only through LOS paths from the arrays 21 and 22 but also through NLOS paths from the arrays 23 and 24 penetrating the partition 411.

As described above, the DAMMS enables communications with not only outdoor terminals but also indoor terminals, thereby effectively reducing outdoor and indoor coverage holes which may occur in use of a high-frequency band.

Further, the DAMMS may decrease a number of cable links between a base station 400 and distributed array antennas from a number of antennas to a number of arrays, thus saving installation and maintenance costs of wired links.

Figure 5:
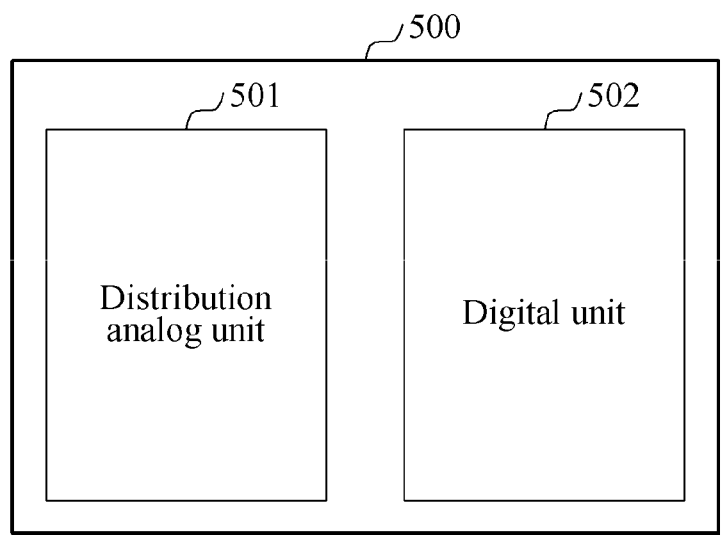
FIG. 5 illustrates an example of a base station.

FIG. 5 illustrates an example of a base station.

Referring to FIG. 5, a base station 500 includes a distribution analog unit 501 and a digital unit 502.

In an example, the distribution analog unit 501 may receive a plurality of analog array receive signals based on a terminal antenna transmit signal from a virtual terminal through a plurality of distributed antenna arrays. The distributed analog unit 501 may include a wired linker to transmit the analog array receive signals through an RF fiber-optic cable to the digital unit 502, and a number of RF fiber-optic cables may be determined based on positions of the distributed antenna arrays.

The digital unit 502 may restore the terminal antenna transmit signal based on the plurality of analog array receive signals and a channel parameter. Here, the channel parameter may include information on a plurality of channels between the virtual terminal and each of the distributed antenna arrays. The digital unit 502 may include an analog-to-digital (A/D) converter, a receive signal divider, a channel estimator, an array selector, a receive beamformer, and a base station receive signal mapper. Hereinafter, related descriptions will also be provided in detail with reference to FIG. 6. The receive beamformer may select an antenna array used to restore the terminal antenna transmission signal from the plurality of distributed antenna arrays based on an array selection index vector. A terminal-oriented virtual cell may be configured based on the antenna array selected by the receive beamformer.

In an example, the distributed analog unit 501 may transmit a plurality of analog array transmit signals through the plurality of distributed antenna arrays to the virtual terminal. The distributed analog unit 501 may include a wired linker to receive the analog array transmit signals from the digital unit 502 through an RF fiber-optic cable, and the number of RF fiber-optic cables may be determined based on positions of the plurality of distributed antenna arrays.

The digital unit 502 may generate a transmit beamforming input signal to be transmitted to the virtual terminal and generate the plurality of analog array transmit signals based on the transmit beamforming input signal and the channel parameter. Here, the channel parameter may include information on a plurality of channels between the virtual terminal and each of the distributed antenna arrays. The digital unit 502 may include a channel estimator, an array selector, a transmit beamformer, a digital-to-analog (D/A) converter, and a base station transmit signal mapper. Hereinafter, related descriptions will also be provided in detail with reference to FIG. 6. The transmit beamformer may select an antenna array used to transmit the transmit beamforming input signal from the plurality of distributed antenna arrays based on an array selection index vector. A terminal-oriented virtual cell may be configured based on the antenna array selected by the transmit beamformer.

Figure 6:
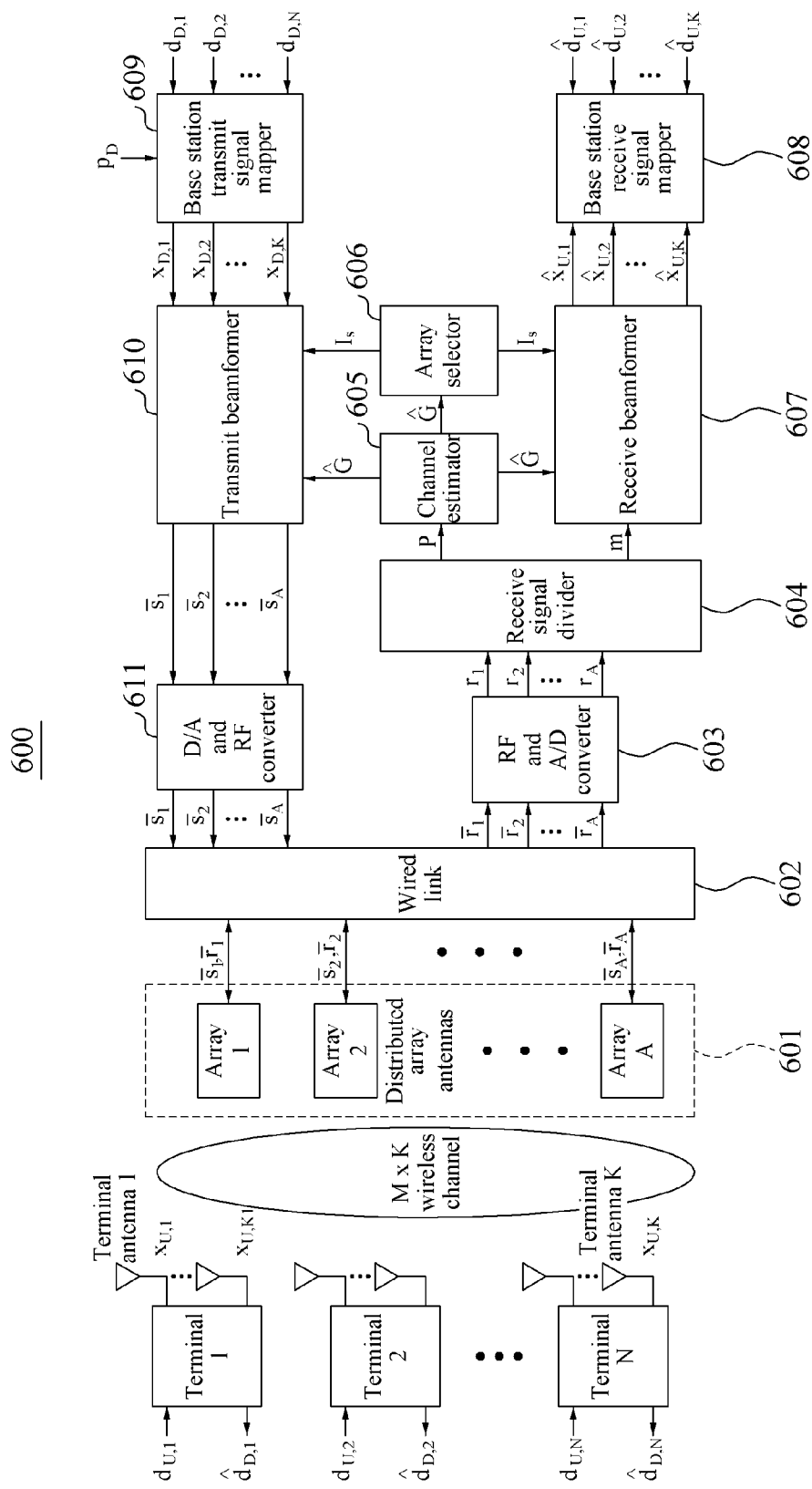
FIG. 6 illustrates an example of an internal configuration of a distributed array massive MIMO communication antenna system.

FIG. 6 illustrates an example of an internal configuration of a DAMMS.

Referring to FIG. 6, a DAMMS 600 may include distributed array antennas 601, a wired link 602, an RF and A/D converter 603, a receive signal divider 604, a channel estimator 605, an array selector 606, a receive beamformer 607, a base station receive signal mapper 608, a base station transmit signal mapper 609, a transmit beamformer 610, and a D/A and RF converter 611.

The distributed array antennas 601 may include a plurality of array antennas, each of which may receive a terminal antenna transmit signal transmitted by a terminal antenna of each terminal.

For instance, an array antenna a may form an analog array receive signal vector $\bar{r}_a$ which is a sum of signals transmitted from K terminal antennas, a=1, 2, . . . , A, A being a natural number, and K being a natural number (bar of $\bar{r}_a$ represents an analog signal). Here, uplink output power of the entire distributed array antennas 601 may be expressed by Equation 1.

$$\bar{r} = \begin{bmatrix} \bar{r}_1 \\ \bar{r}_2 \\ \vdots \\ \bar{r}_A \end{bmatrix} \quad \text{[Equation 1]}$$

Here, a terminal antenna transmit signal may be defined as an antenna transmit signal with respect to a terminal transmit signal. That is, a terminal antenna may convert a terminal transmit signal to be transmitted by a terminal into an antenna transmit signal suitable for a terminal antenna to be actually transmitted, that is, a terminal antenna transmit signal, through mapping. Here, mapping may refer to a process of converting a terminal transmit signal into an antenna transmit signal.

In the following description, it is assumed that a base station having M antennas in total communicates simultaneously with N terminals in a single cell. It is assumed that the N terminals perform transmission using K terminal antennas in total and a terminal n has $K_n$ terminal antennas, n=1, 2, . . . , N and N being a natural number. That is, $K = \sum_{n=1}^{N} K_n$.

In a TDD system, as channel estimation using an uplink pilot signal is needed first of all so that the base station performs forward and backward beamformings, an uplink is described first.

A signal transmitted from a terminal to the base station through an uplink may be defined as a terminal transmit signal. The terminal transmit signal may include a data signal to be transmitted to a counterpart terminal and a pilot signal for channel estimation by the base station.

A data signal vector transmitted through the N terminals is defined by Equation 2.

$$d_U = \begin{bmatrix} d_{U,1} \\ d_{U,2} \\ \vdots \\ d_{U,N} \end{bmatrix} \quad \text{[Equation 2]}$$

Here, $d_{U,n}$ is a data signal vector of terminal n, which may be defined by Equation 3.

$$d_{U,n} = \begin{bmatrix} d_{U,(n,1)} \\ d_{U,(n,2)} \\ \vdots \\ d_{U,(n,K_n)} \end{bmatrix} \quad \text{[Equation 3]}$$

Here, $d_{U,(n,k)}$ may be a data signal transmitted through a $k^{th}$ terminal antenna of the terminal n.

A pilot signal is required for each terminal to transmit a data signal, and a pilot signal vector generated by the N terminals may be defined by Equation 4.

$$p_U = \begin{bmatrix} p_{U,1} \\ p_{U,2} \\ \vdots \\ p_{U,N} \end{bmatrix} \quad \text{[Equation 4]}$$

Here, $p_{U,n}$ is a pilot signal vector of the terminal n, which may be defined by Equation 5.

$$p_{U,n} = \begin{bmatrix} p_{U,(n,1)} \\ p_{U,(n,2)} \\ \vdots \\ p_{U,(n,K_n)} \end{bmatrix} \quad \text{[Equation 5]}$$

Here, $p_{U,(n,k)}$ may be a pilot signal transmitted through the $k^{th}$ terminal antenna of the terminal n.

The DAMMS 600 may be designed, assuming that one terminal antenna corresponds to one virtual terminal. Each virtual terminal has a single terminal antenna and may transmit a single data signal sequence. To this end, a separate pilot signal is necessary.

A signal transmitted through a terminal antenna k (k=1, . . . , K) may be defined as a terminal antenna transmit signal $x_{U,k}$. In this case, a terminal antenna transmit signal vector transmitted through the K terminal antennas may be expressed by Equation 6.

$$x_U = \begin{bmatrix} x_{U,1} \\ x_{U,2} \\ \vdots \\ x_{U,K} \end{bmatrix} \quad \text{[Equation 6]}$$

Here, $x_{U,k}$ may include a data signal and a pilot signal. Data signals of the K terminal antennas may be simultaneously transmitted during a data transmission period. Pilot signals of the respective terminal antennas may be transmitted during independent transmission periods.

A virtual terminal set to have a single terminal antenna may map a terminal transmit signal onto a terminal antenna transmit signal.

Hereinafter, a mapping scheme between a terminal transmit signal and a terminal antenna transmit signal will be described with reference to FIGS. 7 through 9.

Figure 7:
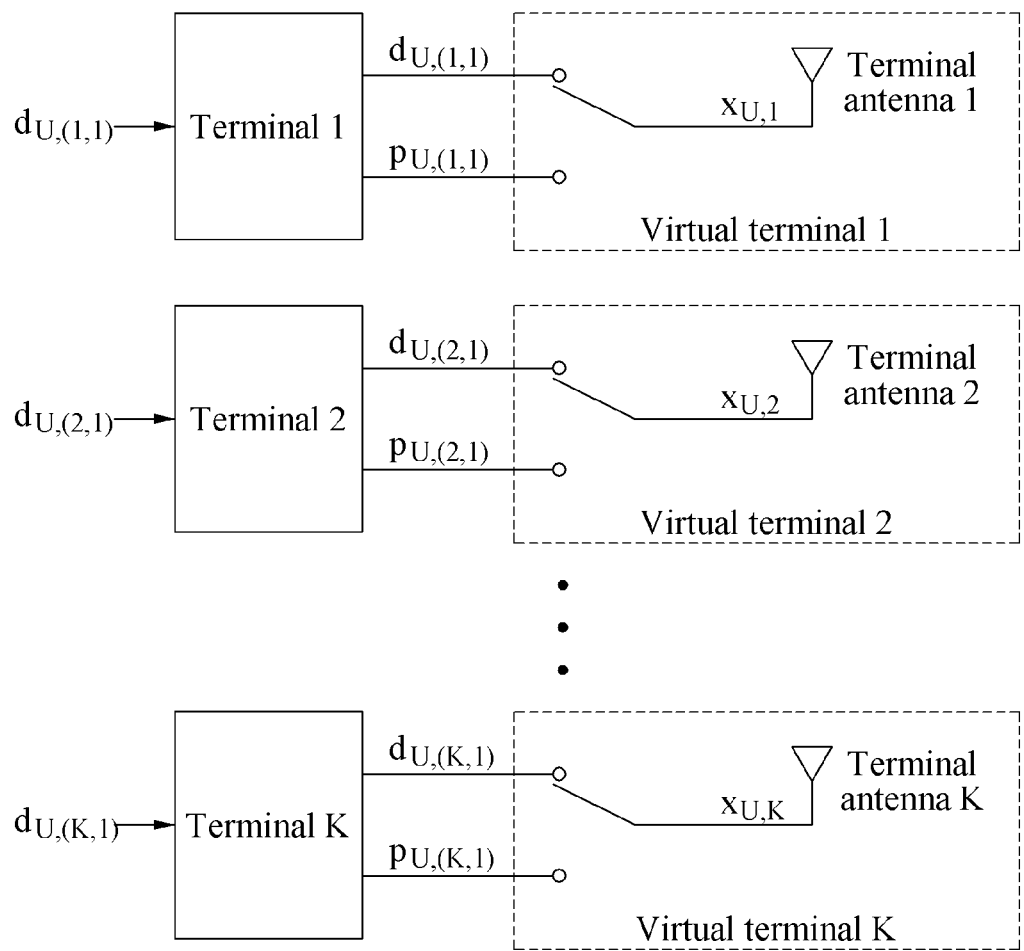
FIG. 7 illustrates an example of a mapping scheme between a terminal transmit signal and a terminal antenna transmit signal when each terminal uses a single terminal antenna for communications.

FIG. 7 illustrates a mapping scheme between a terminal transmit signal and a terminal antenna transmit signal when each terminal uses a single terminal antenna for communications.

Referring to FIG. 7, since a number N of terminals is equal to a number K of terminal antennas, that is, N=K, one terminal transmit signal may be transmitted through one virtual terminal.

A relationship between a terminal transmit signal and a terminal antenna transmit signal in a data signal transmission period may be expressed by Equation 7, and a relationship between a terminal transmit signal and a terminal antenna transmit signal in a pilot signal transmission period may be expressed by Equation 8.

$$x_{U,k} = d_{U,k} \quad \text{[Equation 7]}$$

for k=1, . . . K(=N)

$$x_{U,k} = p_{U,k} \quad \text{[Equation 8]}$$

for k=1, . . . K(=N)

Figure 8:
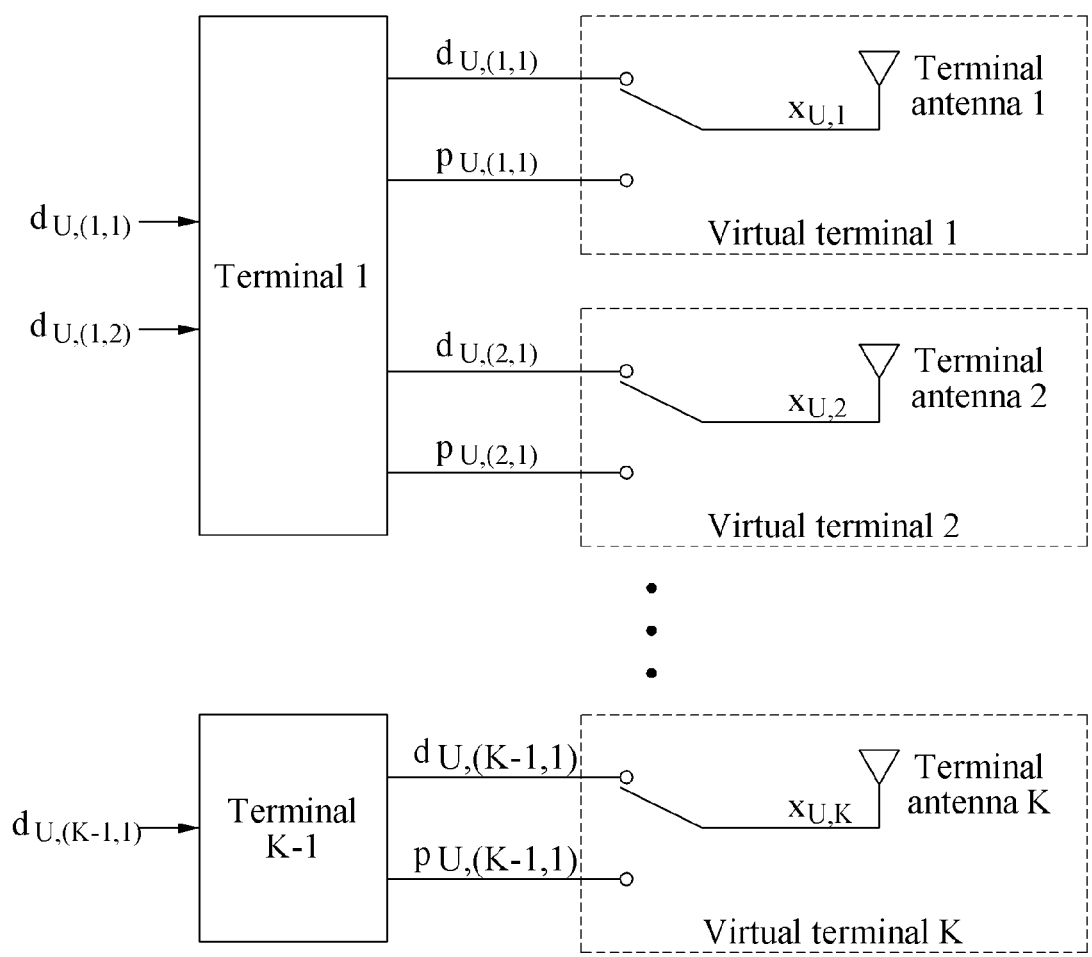
FIG. 8 illustrates an example of a mapping scheme between a terminal transmit signal and a terminal antenna transmit signal when one terminal uses two terminal antennas for communications and remaining terminals use a single terminal antenna for communications.

FIG. 8 illustrates a mapping scheme between a terminal transmit signal and a terminal antenna transmit signal when one terminal uses two terminal antennas for communications and remaining terminals use a single terminal antenna for communications.

Referring to FIG. 8, a terminal 1 may transmit two data signal sequences using two virtual terminals and thus have transmission speed increased by about two times as compared with other terminals.

Here, a total number K of antennas of each terminal determining system capacity may be restricted by channel and system parameters. Thus, when the terminal 1 uses two virtual terminals, a number N of terminals capable of performing simultaneous communications may be K−1, that is, N=K−1, reduced by 1 from an example illustrated in FIG. 7.

A relationship between a terminal transmit signal and a terminal antenna transmit signal in a data signal transmission period may be expressed by Equation 9.

$$\begin{bmatrix} x_{U,1} \\ x_{U,2} \end{bmatrix} = \begin{bmatrix} d_{U,(1,1)} \\ d_{U,(1,2)} \end{bmatrix} \quad \text{[Equation 9]}$$

$x_{U,k} = d_{U,(k-1,1)}$ for $k = 3, \cdots K(= N+1)$

Further, as each virtual terminal requires an independent pilot signal, the terminal 1 needs to transmit two pilot signals, and thus a relationship between a terminal transmit signal and a terminal antenna transmit signal in a pilot signal transmission period may be expressed by Equation 10.

$$\begin{bmatrix} x_{U,1} \\ x_{U,2} \end{bmatrix} = \begin{bmatrix} p_{U,(1,1)} \\ p_{U,(1,2)} \end{bmatrix}$$ [Equation 10]

$$x_{U,k} = p_{U,(k-1,1)} \text{ for } k = 3, \cdots K(=N+1)$$

Figure 9:
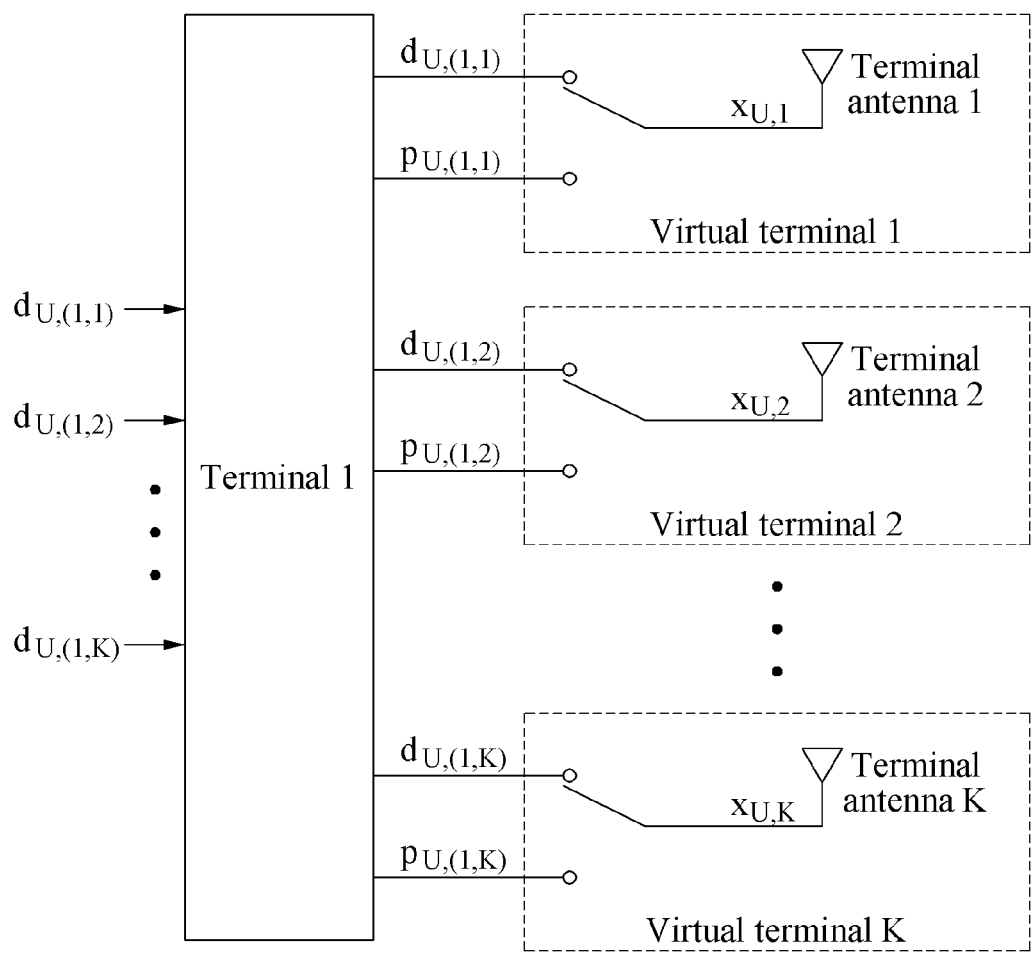
FIG. 9 illustrates an example of a mapping scheme between a terminal transmit signal and a terminal antenna transmit signal when one terminal uses all terminal antennas for communications.

FIG. 9 illustrates a mapping scheme between a terminal transmit signal and a terminal antenna transmit signal when one terminal uses all terminal antennas for communications.

Referring to FIG. 9, high-speed data communications are possible between one terminal using all terminal antennas, for example, a train terminal, and a base station, in which case the train terminal employs all virtual terminals, and thus N=1.

A relationship between a terminal transmit signal and a terminal antenna transmit signal in a data signal transmission period may be expressed by Equation 11, and a relationship between a terminal transmit signal and a terminal antenna transmit signal in a pilot signal transmission period may be expressed by Equation 12.

$$x_{U,k} = d_{U,(1,k)}$$ [Equation 11]

for k=1, ... K $$x_{U,k} = p_{U,(1,k)}$$ [Equation 12]

for k=1, ... K

The N terminals may transmit a terminal antenna transmit signal to the M base station antennas through the K terminal antennas using the same radio resource. That is, a data signal and a pilot signal forming a terminal antenna transmit signal may be transmitted to the distributed array antennas 601 through M×K radio channels defined by Equation 13.

$$G = \begin{bmatrix} g_{1,1} & g_{1,2} & \cdots & g_{1,K} \\ g_{2,1} & g_{2,2} & \cdots & g_{2,K} \\ \vdots & \vdots & \ddots & \vdots \\ g_{A,1} & g_{A,2} & \cdots & g_{A,K} \end{bmatrix}$$ [Equation 13]

Here, $g_{a,k}$ may be an $M_a \times 1$ array channel vector between an array a and a terminal antenna k. Also, radio channel matrix G may be expressed by Equation 14.

$$G = [g_1 \ g_2 \ \ldots \ g_K]$$ [Equation 14]

Here, $g_k$ is an M×1 channel vector between the terminal antenna k and a base station antenna, which may be defined by Equation 15.

$$g_k = \begin{bmatrix} g_{1,k} \\ g_{2,k} \\ \vdots \\ g_{A,k} \end{bmatrix}$$ [Equation 15]

Radio channel matrix G may be divided into A array channel matrices as shown in Equation 16.

$$G = \begin{bmatrix} G_1 \\ G_2 \\ \vdots \\ G_A \end{bmatrix}$$ [Equation 16]

Here, $G_a$ is an $M_a \times K$ array channel matrix between an antenna array a and the K terminal antennas, which may be defined by Equation 17.

$$G_a = [g_{a,1} \ g_{a,2} \ \cdots \ g_{a,K}]$$ [Equation 17]

Referring back to FIG. 6, the wired link 602 may transmit an analog receive signal formed in the distributed array antennas 601 to the RF and A/D converter 603 through a plurality of RF fiber-optic cables. That is, the wired link 602 may convert the analog receive signal input from the distributed array antennas 601 into an optical signal to transmit the optical signal through the RF fiber-optic cables and convert the transmitted optical signal back into an analog receive signal.

Here, in a case of a system transmitting a signal to each array antenna forming the distributed array antennas through a separate fiber-optic cable, A fiber-optic cables corresponding to the number of array antennas may be required. For example, referring to FIG. 5, since arrays 1, 2, 3 and 4 are positioned in the same building, signals for arrays 1, 2, 3 and 4 may be transmitted through a single RF fiber-optic cable. Thus, in an environment shown in FIG. 5, the wired link 602 may include five RF fiber-optic cables in total.

The RF and A/D converter 603 may input an analog array receive signal $\bar{r}_a$ (a=1, 2, ..., A) for each array antenna to output a digital array receive signal vector $r_a$ (a=1, 2, ..., A). That is, the RF and A/D converter 603 may output a digital receive signal r defined by Equation 18 to the receive signal divider 604.

$$r = \begin{bmatrix} r_1 \\ r_2 \\ \vdots \\ r_A \end{bmatrix}$$ [Equation 18]

Here, $r_a$ may be a digital array receive signal vector of an array a (a=1, 2, ..., A). The digital receive signal r may include a pilot signal and a data signal, each of which may be positioned in an independent transmission period.

The receive signal divider 604 may separate the digital receive signal r to output a pilot receive signal matrix P to the channel estimator 605 and to output a data receive signal vector x to the receive beamformer 607.

For example, when the K terminal antennas independently transmit a pilot signal to all the A arrays, the receive signal divider 604 may form an M×K pilot matrix defined by Equation 19 from the digital receive signal r.

$$P = \begin{bmatrix} P_1 \\ P_2 \\ \vdots \\ P_A \end{bmatrix}$$ [Equation 19]

Here, $P_a = [p_{a,1} \ p_{a,2} \ \cdots \ p_{a,K}]$ is an $M_a \times K$ pilot receive signal matrix of the K terminal antennas received through the array a, and $p_{a,k}$ may be an $M_a \times 1$ pilot receive signal vector of the terminal antenna k received through the array a.

The channel estimator 605 may estimate an M×K radio channel matrix G using an input pilot receive signal matrix P and output a channel estimation matrix $\hat{G}$.

The pilot receive signal vector $p_{a,k}$ of the terminal antenna k received through the array a may be expressed by Equation 20.

$$p_{a,k} = g_{a,k} p_{U,k} + n_{a,k} \quad \text{[Equation 20]}$$

Here, $n_{a,k}$ is an $M_a \times 1$ noise vector between the terminal antenna k and the array a, and an average of each element may be 0. The channel estimator 605 may estimate an array channel $g_{a,k}$ using $p_{a,k}$ based on Equation 21.

$$\hat{g}_{a,k} = p_{a,k} \times p^*_{U,k} = g_{a,k}|p_{U,k}|^2 + n_{a,k} p^*_{U,k} = g_{a,k} + n'_{a,k} \quad \text{[Equation 21]}$$

Here, $|p_{U,k}|^2=1$ and, $\mathrm{cov}(n'_{a,k})=\mathrm{cov}(n_{a,k})$. When an array channel does not change during $N_p$ pilot signals, the channel estimator 605 may perform channel estimation by Equation 22.

$$\hat{g}_{a,k} = \frac{1}{N_p} \sum_{n=1}^{N_p} p_{a,k}(n) \times p^*_{U,k}(n) = g_{a,k} + n''_{a,k} \quad \text{[Equation 22]}$$

Here, $$\mathrm{var}(n''_{a,k}) = \frac{1}{N_p}\mathrm{var}(n_{a,k}).$$

That is, the channel estimator 605 may perform more accurate channel estimation as $N_p$ increases.

Further, the channel estimator 605 may output an M×K channel estimation matrix $\hat{G}$ separately by terminal antenna based on Equation 23.

$$\hat{G} = [\hat{g}_1\ \hat{g}_2\ \ldots\ \hat{g}_K] \quad \text{[Equation 23]}$$

Here, $\hat{g}_k$ may be a channel estimation vector of a channel vector $g_k$ between the terminal antenna k and the M base station antennas.

The array selector 606 may determine, based on quality of a channel between each array and each terminal antenna, whether to perform communications via the channel, using the input channel estimation matrix $\hat{G}$. Here, the array selector 606 may determine an array selection index $i_{a,k}$ between the array a and the terminal antenna k based on Equation 24.

$$i_{a,k} = \begin{cases} 1, & \|\hat{g}_{a,k}\|^2 > T_Q \\ 0, & \|\hat{g}_{a,k}\|^2 \leq T_Q \end{cases} \quad \text{[Equation 24]}$$

Here, $T_Q$ indicates a channel quality threshold. The array selector 606 may also output an array selection index matrix $I_s$ defined by Equation 25.

$$I_s = \begin{bmatrix} i_{1,1} & i_{1,2} & \cdots & i_{1,K} \\ i_{2,1} & i_{2,2} & \cdots & i_{2,K} \\ \vdots & \vdots & \ddots & \vdots \\ i_{A,1} & i_{A,2} & \cdots & i_{A,K} \end{bmatrix} \quad \text{[Equation 25]}$$

The receive signal divider 604 may separate the digital receive signal r to output a data receive signal vector m to the receive beamformer 607. Here, the data receive signal vector may be expressed by Equation 26.

$$m = G x_U + n_U \quad \text{[Equation 26]}$$

Here, $x_U$ is a terminal antenna transmit signal vector, $n_U$ is an M×1 uplink noise vector, and an average of each element may be 0.

The receive beamformer 607 may input m and $\hat{G}$ to restore a terminal antenna transmit signal. The receive beamformer 607 may perform receive beamforming using MRC, minimum mean square error (MMSE), zero forcing (ZF) algorithms or the like. Here, since MMSE and ZF require matrix inversion, complexity may increase exponentially with the number M of antennas growing. On the contrary, the MRC algorithm as an optical beamforming algorithm which maximizes instantaneous signal-to-noise ratio (SNR) does not require matrix inversion and has relatively low complexity, and thus the receive beamformer 607 may perform beamforming using the MRC algorithm. Here, MRC receive beamforming with respect to the K terminal antennas may be performed by Equation 27.

$$\hat{x}_U = K_U \hat{G}^H m \quad \text{[Equation 27]}$$

Here, $K_U = \mathrm{diag}(K_{U,1}, K_{U,2}, \ldots, K_{U,K})$ may be a received power adjustment coefficient or diagonal matrix, $K_{U,k}$ may be a received power adjustment coefficient for the terminal antenna k, and $\hat{G}^H$ may be an MRC weighting matrix. Since feedback information from a terminal is not required for MRC receive beamforming, a terminal moving at high speed is also capable of communicating. MRC beamforming output may be expressed by Equation 28.

$$\hat{x}_U = \begin{bmatrix} K_{U,1} \hat{g}_1^H \\ K_{U,2} \hat{g}_2^H \\ \vdots \\ K_{U,K} \hat{g}_K^H \end{bmatrix} m \quad \text{[Equation 28]}$$

As described above, the receive beamformer 607 may perform MRC receive beamforming independently with respect to each terminal antenna.

Hereinafter, the receive beamformer 607 will be described with reference to FIG. 10

Figure 10:
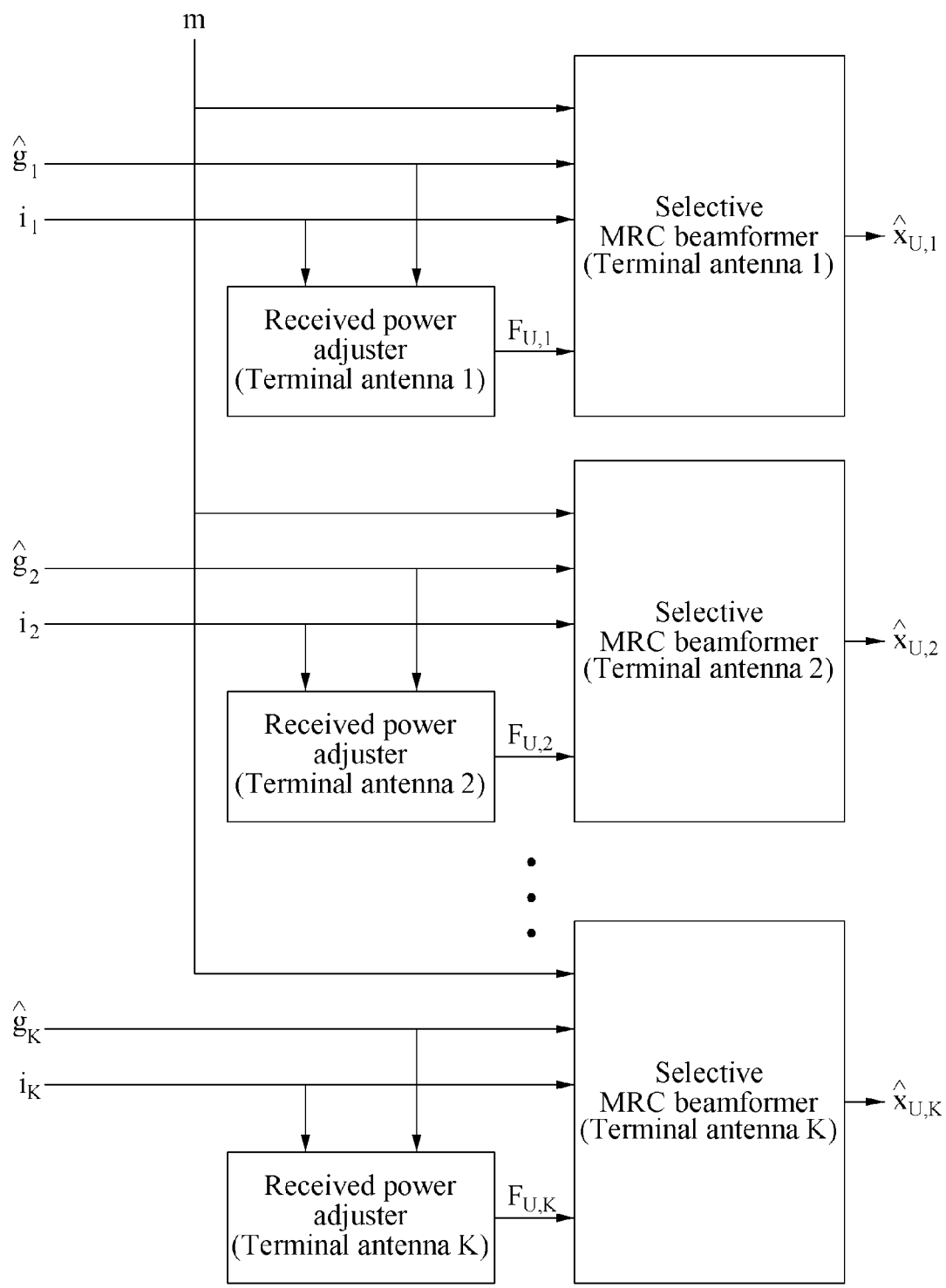
FIG. 10 illustrates an internal structure of a receive beamformer of FIG. 6.

FIG. 10 illustrates an internal structure of the receive beamformer 607 of FIG. 6.

Referring to FIG. 10, the receive beamformer 607 may include a received power adjuster and an MRC beamformer. An output of MRC beamforming with respect to a terminal antenna k (k=1, 2, . . . , K) may be expressed by Equation 29.

$$\hat{x}_{U,k} = K_{U,k} \hat{g}_k^H m \quad \text{[Equation 29]}$$

Here, a receive signal data vector m may be defined for each separate array by Equation 30.

$$m = \begin{bmatrix} m_1 \\ m_2 \\ \vdots \\ m_A \end{bmatrix} \quad \text{[Equation 30]}$$

Here, $m_a$ is a receive data signal vector for an array a. Also, a channel estimation vector $\hat{g}_k$ may be defined for each separate array by Equation 31.

$$\hat{g}_k = \begin{bmatrix} \hat{g}_{1,k} \\ \hat{g}_{2,k} \\ \vdots \\ \hat{g}_{A,k} \end{bmatrix} \quad \text{[Equation 31]}$$

Here, $\hat{g}_{a,k}$ is a channel estimation vector of an array a with respect to a terminal antenna k. An array selection index matrix $I_s$ input from the array selector 606 may be separated into a selection index vectors by terminals by Equation 32.

$$I_s = [i_1 \; i_2 \; \ldots \; i_K] \quad \text{[Equation 32]}$$

Here, $i_k = [i_{1,k} \; i_{1,k} \; \ldots \; i_{A,k}]^T$.

As shown in FIG. 10, the receive beamformer 607 may perform selective MRC beamforming using an array data signal vector, an array channel estimation vector and an array selection index vector. Selective MRC beamforming for the terminal antenna k may be realized by Equation 33.

$$\hat{x}_{U,k} = K_{U,k} \Sigma_{a=1}^A i_{a,k} \hat{g}_{a,k}^H m_a \quad \text{[Equation 33]}$$

Here, $K_{U,k}$ is a received power adjustment coefficient.

The received power adjuster may calculate a received power adjustment coefficient using an array selection index vector and an array channel estimation vector to perform selective MRC beamforming. A received power adjustment coefficient for selective MRC beamforming of the terminal antenna k may be expressed by Equation 34.

$$K_{U,k} = \frac{1}{\sum_{a=1}^A i_{a,k} \|\hat{g}_{a,k}\|^2} \quad \text{[Equation 34]}$$

The receive beamformer 607 may determine whether to perform MRC beamforming by array. That is, when quality of an array channel $g_{a,k}$ between the array a and the terminal antenna k is good, that is, $i_{a,k}=1$, the receive beamformer 607 may perform beamforming. When the quality of the array channel is poor, that is, $i_{a,k}=0$, the receive beamformer 607 may not perform beamforming.

When the channel ($g_{a,k}$) of the array a is poor, a received signal of the array may not greatly contribute to MRC beamforming when $X_{U,k}$ is restored. Generally, in a high-frequency band, such as a millimeter-wave band, quality of NLOS channels may be remarkably deteriorated due to less scattering and high penetration loss by obstacles. An array with poor channel quality may hardly contribute to MRC and also has inferior channel estimation performance, thus even worsening performance. Thus, in the presence of a great number of NLOS arrays, the receive beamformer 607 may perform partial MCR, excluding an array with poor channel quality from MRC beamforming, thereby reducing complexity of the system.

For instance, when array channel thresholds $T_Q$ are divided based on LOS and NLOS in an example of FIG. 5, the terminal 1 may secure the LOS channels with the arrays 1, 5, 9, 15, 18 and 19. Thus, the receive beamformer 607 may perform selective MRC beamforming which includes six arrays among the 24 arrays in performing MRC beamforming and excludes the remaining 18 arrays, thereby remarkably reducing complexity of the system for restoring a transmit signal of the terminal 1. Meanwhile, when one array is considered as a single small cell, six cells of the arrays 1, 5, 9, 15, 18 and 19 are considered to form a virtual cell for the terminal 1. As an array forming a virtual cell varies by terminal, the receive beamformer 607 may form a terminal-oriented virtual cell, for example, a user equipment (UE)-centric virtual cell, through selective MRC beamforming.

The receive beamformer 607 may operate in full MRC beamforming or partial MRC beamforming mode. That is, the receive beamformer 607 may operate in partial MRC mode by excluding a received signal of an array with poor channel status from beamforming. Alternatively, the receive beamformer 607 may set $T_Q=0$ in a process of selecting an array and operate in full MRC mode based on Equation 35 when all arrays are selected.

$$\hat{x}_{U,k} = K_{U,k} \sum_{a=1}^A \hat{g}_{a,k}^H m_a \quad \text{[Equation 35]}$$
$$= K_{U,k} \hat{g}_k^H m$$

Here, a received power adjustment coefficient is expressed by Equation 36.

$$K_{U,k} = \frac{1}{\sum_{a=1}^A \|\hat{g}_{a,k}^H\|^2} = \frac{1}{\|\hat{g}_k^H\|^2} \quad \text{[Equation 36]}$$

The receive beamformer 607 may employ all arrays to restore a transmit signal of each terminal antenna in full MRC mode. Particularly, when average channel characteristics of all arrays are the same or similar, the receive beamformer 607 may operate more efficiently. Full MRC output for the terminal antenna k may be separated as in Equation 37.

$$\hat{x}_{U,k} = K_{U,k} \hat{g}_k^H g_k x_{U,k} + K_{U,k} \sum_{\substack{j=1 \\ j \neq k}}^K \hat{g}_k^H g_j x_{U,j} + K_{U,k} \hat{g}_k^H n_U \quad \text{[Equation 37]}$$

Here, a second term represents interference between users by different terminals, wherein the interference between the users may be completely removed with the number of antennas being infinite. Thus, MRC output for the terminal antenna k may be approximated by Equation 38.

$$\hat{x}_{U,k} = K_{U,k} \hat{g}_k^H g_k x_{U,k} + K_{U,k} \hat{g}_k^H n_U \quad \text{[Equation 38]}$$

When it is assumed that ideal channel estimation ($\hat{g}_k = g_k$) is performed, MRC output for the terminal antenna k may be expressed by Equation 39.

$$\hat{x}_{U,k} = K_{U,k} \|g_k\|^2 x_{U,k} + K_{U,k} g_k^H n_U \quad \text{[Equation 39]}$$
$$= \frac{1}{\|g_k\|^2} \|g_k\|^2 x_{U,k} + \frac{1}{\|g_k\|^2} g_k^H n_U$$
$$= x_{U,k} + \frac{1}{\|g_k\|^2} g_k^H n_U$$

Further, an effective SNR of MRC beamforming output for the terminal antenna k may be defined by Equation 40, thereby exhibiting receive diversity effects of full MRC.

$$SNR_o = \frac{p(x_{U,k})}{\frac{N_0}{\|g_k\|^2}} = \|g_k\|^2 SNR_s \quad \text{[Equation 40]}$$

Here, $p(x_{U,k})$ may be power of $x_{U,k}$, and $SNR_s$ may be an SNR of a base station transmit signal with respect to the terminal antenna k. Also, an output SNR may be expressed with two separate terms by Equation 41.

$$\|g_k\|^2 SNR_s = (M SNR_s)\left(\frac{1}{M}\|g_k\|^2\right) \quad \text{[Equation 41]}$$

Here, $M\,SNR_s$ may represent array gain, and $$\frac{1}{M}\|g_k\|^2$$

may represent diversity gain.

With greater distribution of channel coefficients, diversity gain may increase. In the DAMMS 600, since qualities of channels are substantially different, diversity gain may remarkably increase.

On the contrary, in a centralized phase-arrayed MIMO, since channel coefficients of all antennas have the same size, that is, $|g_{k,1}|=|g_{k,1}|=\ldots=|g_{k,1}|=1$, $$\frac{1}{M}\|g_k\|^2 = 1,$$

diversity gain may be absent.

Referring back to FIG. 6, the base station receive signal mapper 608 may restore a terminal transmit signal using an estimated terminal antenna transmit signal.

As an example, when each terminal has a single terminal antenna as shown in FIG. 7, the receive signal mapper 608 may restore a terminal transmit signal by Equation 42.

$$\hat{d}_U = \begin{bmatrix} \hat{d}_{U,1} \\ \hat{d}_{U,2} \\ \vdots \\ \hat{d}_{U,N} \end{bmatrix} = \begin{bmatrix} \hat{d}_{U,(1,1)} \\ \hat{d}_{U,(2,1)} \\ \vdots \\ \hat{d}_{U,(N,1)} \end{bmatrix} = \begin{bmatrix} \hat{x}_{U,1} \\ \hat{x}_{U,2} \\ \vdots \\ \hat{x}_{U,N} \end{bmatrix} \quad \text{[Equation 42]}$$

As another example, when the terminal 1 uses two terminal antennas for communications and remaining terminals use a single terminal antenna for communications as shown in FIG. 8, the receive signal mapper 608 may restore a terminal transmit signal by Equation 43.

$$\hat{d}_{U,1} = \begin{bmatrix} \hat{d}_{U,(1,1)} \\ \hat{d}_{U,(1,2)} \end{bmatrix} = \begin{bmatrix} \hat{x}_{U,1} \\ \hat{x}_{U,2} \end{bmatrix} \quad \text{[Equation 43]}$$

$$\hat{d}_{U,n} = \hat{d}_{U,(n,1)} = \hat{x}_{U,(n+1)}, \text{ for } n = 2, \ldots N = k-1$$

Alternatively, when the terminal 1 uses the K terminal antennas for communications as shown in FIG. 9, the receive signal mapper 608 may restore a terminal transmit signal by Equation 44.

$$\hat{d}_{U,1} = \begin{bmatrix} \hat{d}_{U,(1,1)} \\ \hat{d}_{U,(1,2)} \\ \vdots \\ \hat{d}_{U,(1,K)} \end{bmatrix} = \begin{bmatrix} \hat{x}_{U,1} \\ \hat{x}_{U,2} \\ \vdots \\ \hat{x}_{U,K} \end{bmatrix} \quad \text{[Equation 44]}$$

In this disclosure, a signal transmitted from the base station to each terminal through a downlink may be defined as a base station transmit signal. The base station transmit signal may include a data signal to be transmitted to each terminal and a pilot signal for the terminal to estimate an amplitude. The DAMMS 600 may transmit the data signal and the pilot signal in independent transmission periods.

The DAMMS 600 may use one terminal antenna as one virtual terminal in a downlink. A signal to be transmitted to a virtual terminal, that is, a terminal antenna, may be defined as a transmit beamforming input signal. Accordingly, a transmit beamforming input signal vector to be transmitted to K virtual terminals (terminal antennas) may be expressed by Equation 45.

$$x_D = \begin{bmatrix} x_{D,1} \\ x_{D,2} \\ \vdots \\ x_{D,K} \end{bmatrix} \quad \text{[Equation 45]}$$

Here, $x_{D,k}$ is a transmit beamforming input signal to be transmitted to the terminal antenna k and includes a data signal and a pilot signal. A terminal n may have $K_n$ antennas, and N terminals may receive a signal through K terminal antennas in total. That is, $K=\Sigma_{n=1}^{N} K_n$. A data signal vector to be transmitted to the N terminals may be expressed by Equation 46.

$$d_D = \begin{bmatrix} d_{D,1} \\ d_{D,2} \\ \vdots \\ d_{D,N} \end{bmatrix} \quad \text{[Equation 46]}$$

Here, $d_{D,n}$ is a data signal vector to be transmitted by the base station to the terminal n, which may be defined by Equation 47.

$$d_{D,n} = \begin{bmatrix} d_{D,(n,1)} \\ d_{D,(n,2)} \\ \vdots \\ d_{,(n,K_n)} \end{bmatrix} \quad \text{[Equation 47]}$$

Here, $d_{D,(n,k)}$ may indicate a data signal to be transmitted to a $k^{th}$ terminal antenna of the terminal n.

The DAMMS 600 transmits a separate pilot signal to each terminal antenna using an independent transmission period in the uplink but may transmit the same pilot signal simultaneously to all terminal antennas using the same transmission period in the downlink. Here, a K×1 downlink pilot signal vector to be transmitted to the K virtual terminals may be expressed by Equation 48.

$$p_D = \begin{bmatrix} p_D \\ p_D \\ \vdots \\ p_D \end{bmatrix}$$ [Equation 48]

Here, $p_D$ is a pilot signal transmitted to all terminal antennas, and $|p_D|=1$.

Hereinafter, the base station transmit signal mapper 609 will be described with reference to FIG. 11.

Figure 11:
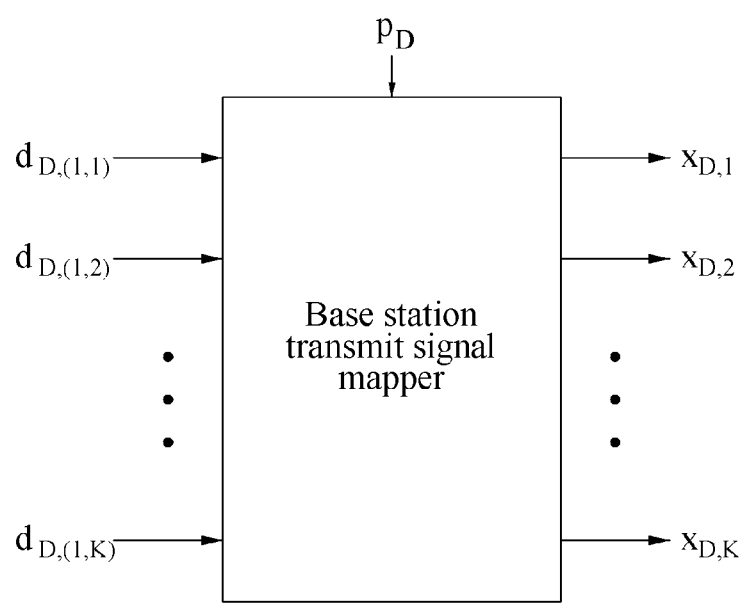
FIG. 11 illustrates a mapping scheme between a base station transmit signal and a transmit beamforming input signal for a base station transmit signal mapper of FIG. 6.

FIG. 11 illustrates an example of a mapping scheme between a base station transmit signal and a transmit beamforming input signal.

Referring to FIG. 11, the base station transmit signal mapper 609 may function to map a base station transmit signal onto a transmit beamforming input signal.

As shown in FIG. 7, when each terminal has a single terminal antenna, a relationship between a base station transmit signal and a transmit beamforming input signal in a data signal transmission period may be expressed by Equation 49, and a relationship between a base station transmit signal and a transmit beamforming input signal in a pilot signal transmission period may be expressed by Equation 50.

$x_{D,k} = d_{D,k}$ [Equation 49]

for $k=1, \ldots K(=N)$ $x_{D,k} = p_D$ [Equation 50]

for $k=1, \ldots K(=N)$

As shown in FIG. 8, when the terminal 1 uses two terminal antennas for communications and the remaining terminals use a single terminal antenna for communications, a relationship between a base station transmit signal and a transmit beamforming input signal in a data signal transmission period may be expressed by Equation 51, and a relationship between a base station transmit signal and a transmit beamforming input signal in a pilot signal transmission period may be expressed by Equation 52.

$$\begin{bmatrix} x_{D,1} \\ x_{D,2} \end{bmatrix} = \begin{bmatrix} d_{D,(1,1)} \\ d_{D,(1,2)} \end{bmatrix}$$ [Equation 51]

$x_{D,k} = d_{D,(k-1,1)}$ for $k = 3, \ldots K(=N+1)$ $x_{D,k} = p_D$ [Equation 52]

for $k = 1, \ldots K(=N)$

As shown in FIG. 9, when the terminal 1 uses all terminal antennas for communications, a relationship between a base station transmit signal and a transmit beamforming input signal in a data signal transmission period may be expressed by Equation 53, and a relationship between a base station transmit signal and a transmit beamforming input signal in a pilot signal transmission period may be expressed by Equation 54.

$x_{D,k} = d_{D,(1,k)}$ [Equation 53]

for $k=1, \ldots K$ $x_{D,k} = p_D$ [Equation 54]

for $k=1, \ldots K$

Referring back to FIG. 6, the transmit beamformer 610 may perform transmit beamforming so as to transmit a base station transmit signal to each terminal antenna. The transmit beamformer 610 may perform transmit beamforming using maximal ratio transmission (MRT), MMSE, ZF algorithms or the like.

Here, when the transmit beamformer 610 uses the MMSE and ZF algorithms which require matrix inversion, complexity may increase with the number M of antennas growing. On the contrary, when the MRT algorithm as an optical beamforming algorithm which maximizes instantaneous SNR is used, matrix inversion is not required, and thus complexity may be relatively reduced.

When the transmit beamformer 610 performs MRT transmit beamforming using the MRT algorithm, feedback information from a terminal is not required, and thus a terminal moving at high speed may be provided with a service. For example, an output from the transmit beamformer 610 may be expressed by Equation 55.

$s = K_D \hat{G}^* x_D$ [Equation 55]

Here, $K_D$ is a transmitted power adjustment coefficient, and $\hat{G}^*$ is an MRT weighting matrix. A transmit beamforming input signal vector $x_D$ may be a base station transmit signal vector $d_D$ in a data transmission period and be a pilot signal vector $p_D$ in a pilot signal transmission period. A channel estimation matrix $\hat{G}$ may be separated into channel estimation matrices for each of A arrays by Equation 56.

$$\hat{G} = \begin{bmatrix} \hat{G}_1 \\ \hat{G}_2 \\ \vdots \\ \hat{G}_A \end{bmatrix}$$ [Equation 56]

Here, $\hat{G}_a$ is a channel estimation matrix between an array a and the K terminal antennas, which may be defined by Equation 57.

$\hat{G}_a = [\hat{g}_{a,1} \ \hat{g}_{a,2} \ldots \hat{g}_{a,K}]$ [Equation 57]

MRT transmit beamforming output may be separated into MRT transmit beamforming outputs by array. MRT transmit beamforming output of array a may be defined by Equation 58.

$s_a = K_D \hat{G}^*_a x_D$ [Equation 58]

In this case, entire MRT transmit beamforming output may be separate into MRT transmit beamforming outputs by array based on Equation 59.

$$s = \begin{bmatrix} s_1 \\ s_2 \\ \vdots \\ s_A \end{bmatrix}$$ [Equation 59]

The transmit beamformer 610 performs the MRT algorithm for all terminal antennas by array and thus may operate more efficiently when channel characteristics of all terminal antennas are similar in each array.

If the channel ($g_{a,k}$) between the array a and a terminal antenna k is poor, transmission success rate is low and channel estimation performance is also inferior to cause interference in other terminals, thus deteriorating performances of the other terminals. Moreover, as transmit power is allocated to a terminal with a low transmission success rate, transmit power may be wasted and performance of a normal terminal may be deteriorated. Thus, regarding the array a, the transmit beamformer 610 may exclude data transmission to the terminal antenna k and allocate transmit power for the terminal antenna k to another terminal. In this case, the terminal antenna k may receive a signal through another array with good channel quality. That is, the transmit beamformer 610 may exclude a terminal antenna with poor channel quality from MRT in each array, thereby reducing system complexity without any considerable change in performance.

Hereinafter, the transmit beamformer 610 will be described with reference to FIG. 12.

Figure 12:
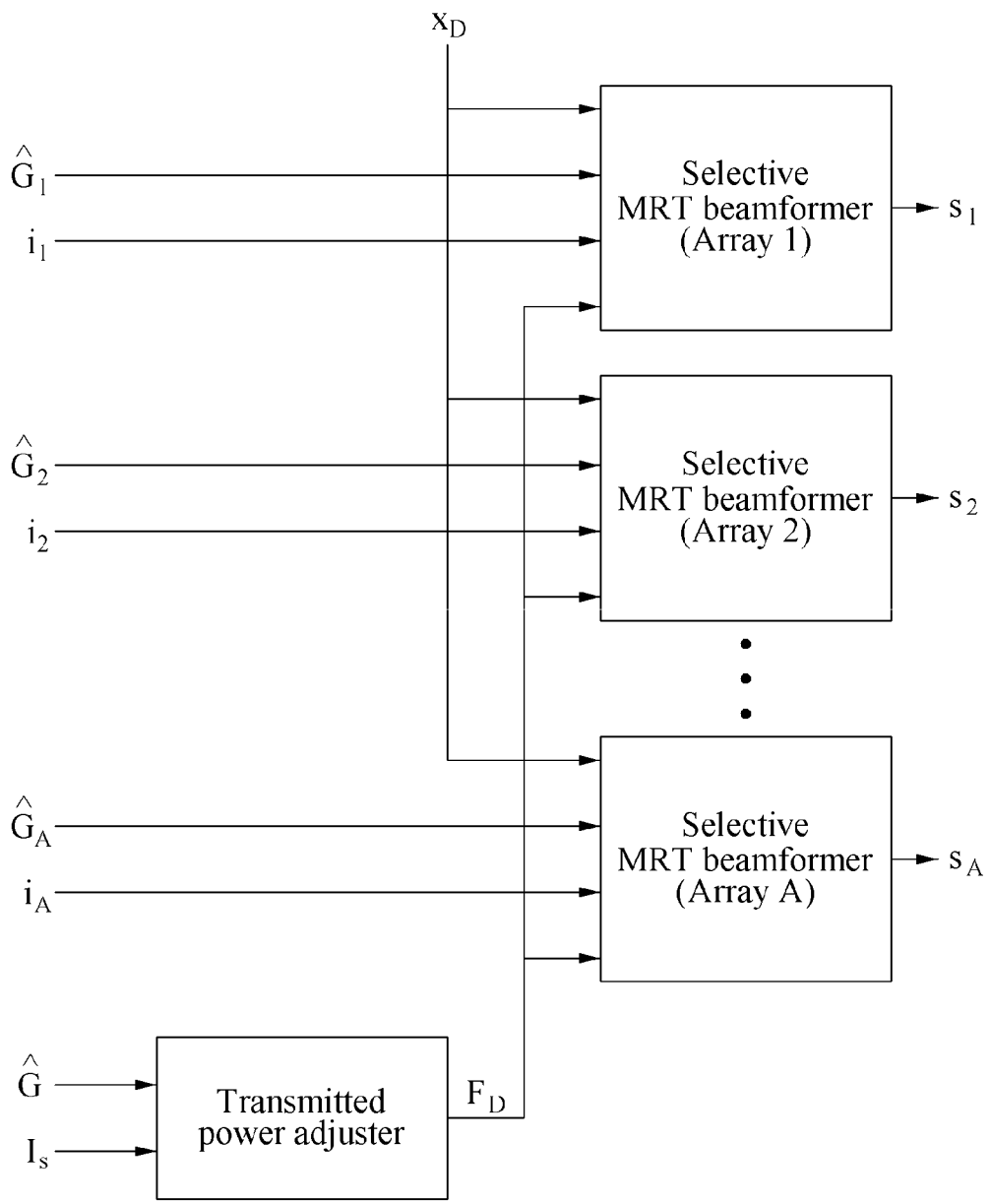
FIG. 12 illustrates an internal structure of a transmit beamformer of FIG. 6.

FIG. 12 illustrates an internal structure of the transmit beamformer 610 of FIG. 6.

Referring to FIG. 12, the transmit beamformer 610 may include a transmitted power adjuster and a selective MRC beamformer. Here, an array selection index matrix $I_s$ may be separated for each array by Equation 60.

$$I_s = \begin{bmatrix} \underline{i}_1 \\ \underline{i}_2 \\ \vdots \\ \underline{i}_A \end{bmatrix}$$ [Equation 60]

Here, $\underline{i}_a$ is an array selection index vector for each array, which may be defined by Equation 61.

$$\underline{i}_a = [i_{a,1}\ i_{a,2}\ \ldots\ i_{a,K}]$$ [Equation 61]

The transmit beamformer 610 may perform selective MRT beamforming using an array selection index for each array based on Equation 62.

$$s_a = K_D \sum_{k=1}^{K} i_{a,k} \hat{g}^*_{a,k} x_{D,k}$$ [Equation 62]

Here, $x_{D,k}$ is a transmit beamforming input signal to be transmitted to a virtual terminal k, wherein $x_{D,k} = d_{D,k}$ in a data signal transmission period and $x_{D,k} = p_D$ in a pilot signal transmission period.

When the quality of the array channel $g_{a,k}$ between the array a and the terminal antenna k is good, that is, $i_{a,k}=1$, the transmit beamformer 610 may perform MRT beamforming. When the quality of the array channel is poor, that is, $i_{a,k}=0$, the transmit beamformer 610 may not transmit a signal to the terminal antenna by excluding the terminal antenna from beamforming.

For example, when array channel thresholds $T_Q$ are divided based on LOS and NLOS in FIG. 5, array 19 may secure LOS channels with terminals 1 and K only, and thus the transmit beamformer 610 may perform transmit beamforming with the two terminals. Also, the transmit beamformer 610 does not transmit a transmit signal to a terminal 2 which is adjacent to an array 19 but does not secure an LOS channel, thereby preventing waste of transmit power. That is, in an example, only terminals capable of communicating are selected for each array to perform communications, thereby effectively using radio resources, such as transmit power and base station consumed power. Here, the terminal 2 does not receive a base station transmit signal via the array 19 but may receive a base station transmit signal through arrays 1, 5, 8, 9, 10 and 15.

The transmitted power adjuster may calculate a base station transmit power coefficient using input $\hat{G}$ and $I_s$ by Equation 63.

$$K_D = \frac{1}{\sum_{k=1}^{K}\sum_{a=1}^{A} i_{a,k}\|\hat{g}_{a,k}\|}$$ [Equation 63]

Here, the transmitted power adjuster may calculate the same transmit power coefficient with respect to all terminals, unlike the aforementioned received power adjustment coefficient, and thus maintain the same transmit power all the time regardless of a number of selected arrays and a channel change.

Referring back to FIG. 6, the D/A and RF converter 611 may input a digital array transmit signal vector $s_a$ (a=1, 2, ..., A) to output an analog array transmit signal vector $\bar{s}_a$ (a=1, 2, ..., A). Here, an array transmit beamforming output vector may be defined as the digital array transmit signal vector. That is, the D/A and RF converter 611 may output an analog base station transmit signal vector $\bar{s}$ defined by Equation 64.

$$\bar{s} = \begin{bmatrix} \bar{s}_1 \\ \bar{s}_2 \\ \vdots \\ \bar{s}_A \end{bmatrix}$$ [Equation 64]

The wired link 602 may output the input analog base station transmit signal vector to the distributed array antennas 601 through an RF fiber-optic cable.

The distributed array antennas 601 may transmit the input analog base station transmit signal vector to the K terminal antennas through the M transmitting antennas formed of the A arrays.

Signal restoration may be performed by virtual terminal regardless of the number of terminals.

Figure 13:
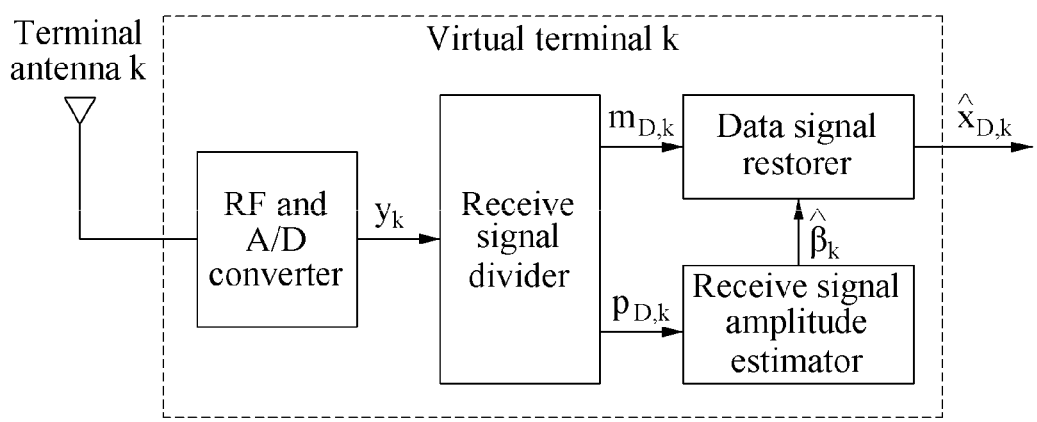
FIG. 13 illustrates an example of a receiving structure of a virtual terminal.

FIG. 13 illustrates an example of a receiving structure of a virtual terminal.

The virtual terminal may include a terminal antenna, an RF and A/D converter, a receive signal divider, a receive signal amplitude estimator, and a data signal restorer.

The RF and A/D converter may convert a signal received through the terminal antenna into a digital received signal. A digital received signal of a terminal antenna k may be expressed by Equation 65.

$$y_k = g_k^T s + n_{D,k}$$ [Equation 65]

Here, s is a transmit beamforming output signal vector, and $n_{D,k}$ may be additive white Gaussian noise (AWGN).

In the DAMMS 600, a signal in a transmit-beamformed vector form may be converted into a scalar signal while passing through a channel. Thus, the virtual terminal may use an SISO receiver to restore a received signal.

The receive signal divider may output a data signal $m_{D,k}$ and a pilot signal $p_{D,k}$ separately from the digital received signal. The data signal $m_{D,k}$ may be expressed by Equation 66.

$$m_{D,k} = K_D g_k^T \hat{g}_k^* x_{D,k} + K_D \sum_{j=1, j \neq k}^{K} g_k^T \hat{g}_j^* x_{D,j} + n_{D,k}$$

$$= \beta_k x_{D,k} + i_{D,k} + n_{D,k}$$ [Equation 66]

Here, $\beta_k = K_D g_k^T \hat{g}^*_k$ is an amplitude of a received signal, and $i_{D,k}$ is interference between downlink users.

Downlink user interference $i_{D,k}=\Sigma_{j=1,j\neq k}^{K}g_k^T \hat{g}^*_j d_{Dj}$ may be cancelled as spatial signatures to different users are asymptotically orthogonal ($\lim_{M\to\infty} g_k^T g^*_j = 0$) with M being infinite. Thus, a data signal of the terminal antenna k may be approximated by Equation 67 with M increasing.

$$m_{D,k} \approx \beta_k x_{D,k} + n_{D,k} \qquad \text{[Equation 67]}$$

Here, the amplitude $\beta_k$ of the received signal may need estimating in order to restore a transmit beamforming input signal $x_{D,k}$ with respect to a virtual terminal k. A pilot receive signal output from the receive signal divider may be expressed by Equation 68.

$$p_{D,k} = \beta_k p_D + n_{D,k} \qquad \text{[Equation 68]}$$

The receive signal amplitude estimator may estimate the amplitude of the received signal using a pilot receive signal by Equation 69.

$$\hat{\beta}_k = p^*_D p_{D,k} = \beta_k |p_D|^2 + p^*_D n_{D,k} = \beta_k + n'_{D,k}, \qquad \text{[Equation 69]}$$

Here, $|p_D|^2 = 1$ and, $\text{var}(n'_{D,k}) = \text{var}(n_{D,k})$.

The receive signal amplitude estimator may estimate a channel by Equation 70 when a pilot signal does not change for $N_p$ symbols.

$$\hat{\beta}_k = \frac{1}{N_p}\sum_{n=1}^{N_p} p^*_D(n) p_{D,k}(n) = \beta_k + n''_{D,k} \qquad \text{[Equation 70]}$$

Here, $$\text{var}(n''_{D,k}) = \frac{1}{N_p}\text{var}(n_{D,k}).$$

That is, the receive signal amplitude estimator may estimate a channel more accurately with $N_p$ increasing.

The data signal restorer may estimate a transmit beamforming input signal based on Equation 71 by adjusting an amplitude of a data signal.

$$\hat{x}_{D,k} = \frac{m_{D,k}}{\hat{\beta}_k} \qquad \text{[Equation 71]}$$
$$= \frac{\beta_k}{\hat{\beta}_k} x_{D,k} + \frac{i_{D,k}}{\hat{\beta}_k} + \frac{n_{D,k}}{\hat{\beta}_k}$$
$$\approx \frac{\beta_k}{\hat{\beta}_k} x_{D,k} + \frac{n_{D,k}}{\hat{\beta}_k}$$

When amplitude estimation is ideal, for example, $\hat{\beta}_k = \beta_k$, a restored transmit beamforming input signal may be expressed by Equation 72.

$$\hat{x}_{D,k} \approx x_{D,k} + \frac{n_{D,k}}{\hat{\beta}_k} \qquad \text{[Equation 72]}$$

Here, when channel estimation is ideal at the base station, the amplitude of the received signal is $\beta_k \propto \|g_k\|^2$ which is the highest, and accordingly distribution of $$\frac{n_{D,k}}{\hat{\beta}_k}$$

is the lowest, enabling optimal MRT transmit beamforming.

A terminal receive signal mapper may restore a base station data transmit signal by mapping the estimated transmit beamforming input signal based on the number of terminal antennas.

When each terminal has a single terminal antenna as shown in FIG. 7, the terminal receive signal mapper may restore a base station data transmit signal by Equation 73.

$$\hat{d}_D = \begin{bmatrix} \hat{d}_{D,1} \\ \hat{d}_{D,2} \\ \vdots \\ \hat{d}_{D,N} \end{bmatrix} = \begin{bmatrix} \hat{d}_{D,(1,1)} \\ \hat{d}_{D,(2,1)} \\ \vdots \\ \hat{d}_{D,(N,1)} \end{bmatrix} = \begin{bmatrix} \hat{x}_{D,1} \\ \hat{x}_{D,2} \\ \vdots \\ \hat{x}_{D,N} \end{bmatrix} \qquad \text{[Equation 73]}$$

When a terminal 1 uses two terminal antennas for communications and other terminals use a single antenna for communications as shown in FIG. 8, the terminal receive signal mapper may restore a base station data transmit signal by Equation 74.

$$\hat{d}_{D,1} = \begin{bmatrix} \hat{d}_{D,(1,1)} \\ \hat{d}_{D,(1,2)} \end{bmatrix} = \begin{bmatrix} \hat{x}_{D,1} \\ \hat{x}_{D,2} \end{bmatrix} \qquad \text{[Equation 74]}$$

$$\hat{d}_{D,n} = \hat{d}_{D,(n,1)} = \hat{x}_{D,(n+1)},$$

for $n = 2, \ldots N = K - 1$

When the terminal 1 uses the K terminal antennas for communications as shown in FIG. 9, the terminal receive signal mapper may restore a base station data transmit signal by Equation 75.

$$\hat{d}_{D,1} = \begin{bmatrix} \hat{d}_{D,(1,1)} \\ \hat{d}_{D,(1,2)} \\ \vdots \\ \hat{d}_{D,(1,K)} \end{bmatrix} = \begin{bmatrix} \hat{x}_{D,1} \\ \hat{x}_{D,2} \\ \vdots \\ \hat{x}_{D,K} \end{bmatrix} \qquad \text{[Equation 75]}$$

Figure 14:
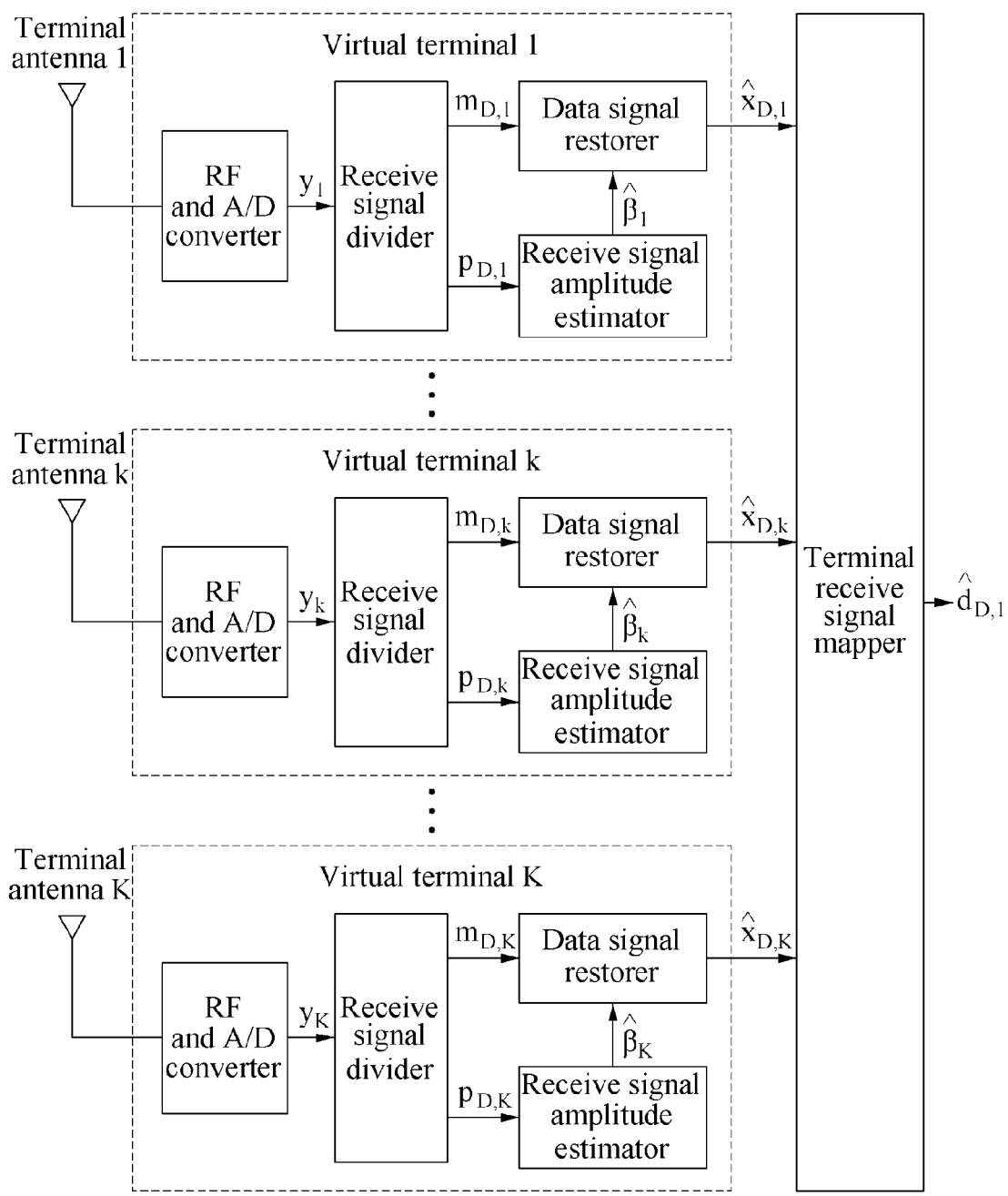
FIG. 14 illustrates an example of a receiving structure of a terminal.

FIG. 14 illustrates an example of a receiving structure of a terminal.

FIG. 14 shows a mapping scheme of a terminal receive signal when a terminal 1 includes K terminal antennas.

Hereinafter, an operation procedure of the DAMMS 600 will be described in detail with reference to FIG. 15.

Figure 15:
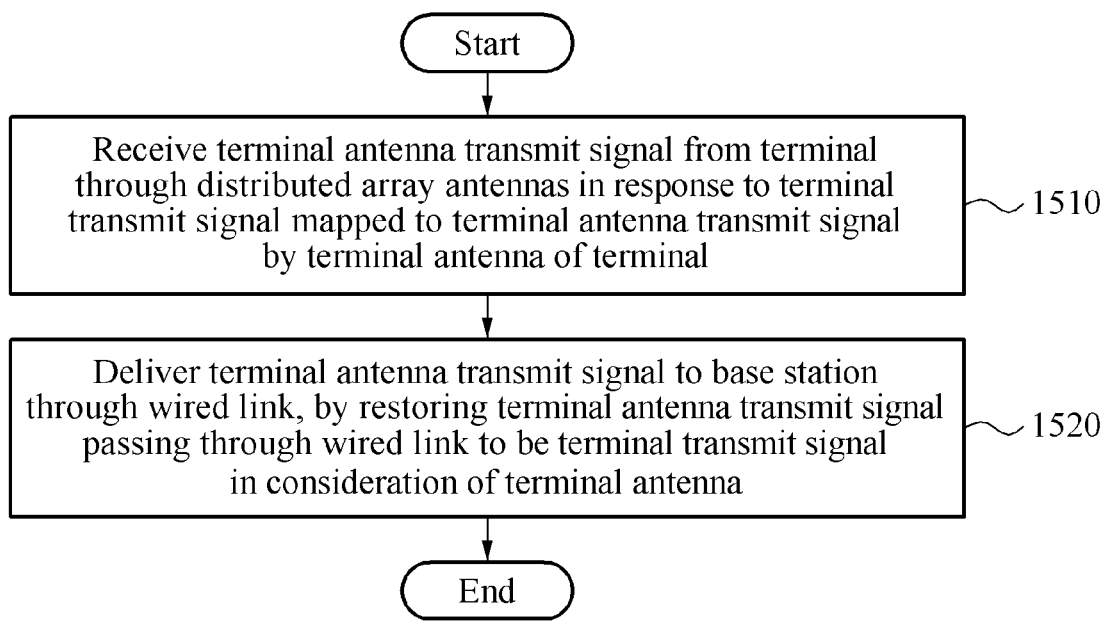
FIG. 15 illustrates an example of an operation method of a distributed array massive MIMO communication antenna system.

FIG. 15 illustrates an example of a DAMMS operation method.

The DAMMS operation method may be performed by the aforementioned DAMMS 600.

Referring to FIG. 15, in operation 1510, the DAMMS 600 receives a terminal antenna transmit signal from a terminal through distributed array antennas in response to a terminal transmit signal mapped to the terminal antenna transmit signal by a terminal antenna of the terminal.

Here, the terminal antenna transmit signal may be defined as an antenna transmit signal with respect to the terminal transmit signal. That is, the terminal antenna may convert a terminal transmit signal to be transmitted by the terminal into an antenna transmit signal suitable for a terminal antenna to be actually transmitted, that is, a terminal antenna transmit signal, through mapping. Here, mapping may refer to a process of converting a terminal transmit signal into an antenna transmit signal.

The DAMMS 600 may receive the terminal antenna transmit signal, transmitted through a radio channel from the terminal, using an array antenna associated with the radio channel among a plurality of array antennas forming the distributed array antennas.

The terminal antenna transmit signal is transmitted from the terminal for each radio channel as many as a number calculated by multiplying a number of antennas included in the distributed array antennas and a number of terminal antennas.

In operation 1520, the DAMMS 600 delivers the terminal antenna transmit signal to a base station through a wired link, by restoring the terminal antenna transmit signal passing through the wired link to be the terminal transmit signal in consideration of the terminal antenna.

When the wired link is an RF fiber-optic cable, the DAMMS 600 may convert the terminal antenna transmit signal into an optical signal to use the RF fiber-optic cable.

The DAMMS 600 may estimate the radio channel through which the terminal antenna transmit signal is transmitted using a pilot signal separated from the terminal antenna transmit signal.

Additionally, the DAMMS 600 may restore a data signal separated from the terminal antenna transmit signal into the terminal transmit signal based on the estimated radio channel using an MRC algorithm.

Also, the DAMMS 600 may determine whether to perform MRC beamforming to the estimated radio channel using a received power adjustment coefficient with respect to each array antenna forming the distributed array antennas.

In an example, the DAMMS 600 may covert a base station transmit signal transmitted by the base station into an array transmit signal to be transmitted to the terminal antenna of the terminal based on an MRT algorithm and transmit the array transmit signal to the terminal through the distributed array antennas.

The DAMMS 600 may determine whether to perform MRT transmit beamforming based on a quality of a channel between the array antennas and the terminal antenna using a transmitted power adjustment coefficient for the base station with respect to the array antennas forming the distributed array antennas.

For instance, the terminal may receive the array transmit signal to estimate a transmit beamforming input signal with respect to the array transmit signal by a virtual terminal set to have a single terminal antenna and restore the estimated transmit beamforming input signal to be the base station transmit signal based on the number of terminal antennas.

Here, the virtual terminal may estimate an amplitude of the array transmit signal and adjust an amplitude of a data signal separated from the array transmit signal using a pilot signal separated from the array transmit signal to estimate the transmit beamforming input signal with respect to the array transmit signal.

In an example, the terminal may be implemented as a SISO receiver with a single terminal antenna.

The above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

While a few example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits are combined or coupled in different forms and modes than as described above or be substituted or switched with other components or equivalents.

Thus, other implementations, alternative embodiments and equivalents to the claimed subject matter are construed as being within the appended claims.

What is claimed is:

1. A base station comprising:
a distribution analog unit configured to receive a plurality of analog array receive signals from a virtual terminal through a plurality of distributed antenna arrays; and
a digital unit configured to restore a terminal antenna transmit signal based on the plurality of analog array receive signals and a channel parameter,
wherein the channel parameter is information on a plurality of channels between the virtual terminal and each of the distributed antenna arrays, and
wherein the digital unit comprises:
an analog-to-digital (A/D) converter configured to convert the analog array receive signals into digital array receive signals;
a receive signal divider configured to divide the digital array receive signals into pilot receive signals and data receive signals;
a channel estimator configured to generate a channel estimation vector for the plurality of channels based on the pilot receive signals;
an array selector configured to generate an array selection index vector related to a quality of the plurality of channels based on the channel estimation vector; and
a receive beamformer configured to restore the terminal antenna transmit signal based on the data receive signals, the channel estimation vector, and the array selection index vector.

2. The base station of claim 1, wherein the distribution analog unit comprises a wired linker to deliver the analog array receive signals through radio frequency (RF) fiber-optic cables to the digital unit, and a number of RF fiber-optic cables is determined based on positions of the plurality of distributed antenna arrays.

3. The base station of claim 1, wherein the array selector compares the channel estimation vector with a channel quality threshold to generate the array selection index vector.

4. The base station of claim 1, wherein the receive beamformer comprises:

a received power adjuster configured to perform an operation to obtain a received power adjustment coefficient for the virtual terminal based on the array selection index vector and the channel estimation vector; and a selective maximal ratio combining (MRC) beamformer configured to restore the terminal antenna transmit signal based on a selective MRC beamforming scheme using the data receive signals, the received power adjustment coefficient, the channel estimation vector, and the array selection index vector.

5. The base station of claim 1, wherein the receive beamformer selects an antenna array used to restore the terminal antenna transmit signal from the plurality of distributed antenna arrays based on the array selection index vector, and a terminal-oriented virtual cell of the virtual terminal is configured based on the selected antenna array.

6. The base station of claim 1, wherein the virtual terminal corresponds to one of a plurality of antennas of a terminal.

7. The base station of claim 6, wherein the digital unit further comprises a base station receive signal mapper configured to map the restored terminal antenna transmit signal to a terminal transmit signal, and the terminal transmit signal is a signal to be transmitted from the terminal through an uplink to the base station.

8. The base station of claim 1, wherein the distribution analog unit receives the plurality of analog array receive signals in a millimeter-wave (mmWave) band.

9. A base station comprising:
a digital unit configured to generate a transmit beamforming input signal to be transmitted to a virtual terminal and generate a plurality of analog array transmit signals based on the transmit beamforming input signal and a channel parameter; and
a distribution analog unit configured to transmit the plurality of analog array transmit signals through a plurality of distributed antenna arrays,
wherein the channel parameter is information on a plurality of channels between the virtual terminal and each of the distributed antenna arrays, and
wherein the digital unit comprises:
a channel estimator configured to generate a channel estimation vector for the plurality of channels;
an array selector configured to generate an array selection index vector related to a quality of the plurality of channels based on the channel estimation vector;
a transmit beamformer configured to generate digital array transmit signals based on the transmit beamforming input signal, the channel estimation vector, and the array selection index vector; and
a digital-to analog (D/A) converter configured to convert the digital array transmit signals into the analog array transmit signals.

10. The base station of claim 9, wherein the distribution analog unit comprises a wired linker to receive the analog array transmit signals through a radio frequency (RF) fiber-optic cable from the digital unit, and a number of RF fiber-optic cables is determined based on positions of the plurality of distributed antenna arrays.

11. The base station of claim 9, wherein the array selector compares the channel estimation vector with a channel quality threshold to generate the array selection index vector.

12. The base station of claim 9, wherein the transmit beamformer comprises:
a transmitted power adjuster configured to perform an operation to obtain a transmitted power adjustment coefficient for the virtual terminal based on the array selection index vector and the channel estimation vector; and
a selective maximal ratio combining (MRC) beamformer configured to generate the digital array transmit signals based on a selective MRC beamforming scheme using the transmit beamforming input signal, the transmitted power adjustment coefficient, the channel estimation vector, and the array selection index vector.

13. The base station of claim 9, wherein the transmit beamformer selects an antenna array used to transmit the transmit beamforming input signal from the plurality of distributed antenna arrays based on the array selection index vector, and a terminal-oriented virtual cell of the virtual terminal is configured based on the selected antenna array.

14. The base station of claim 9, wherein the virtual terminal corresponds to one of a plurality of antennas of a terminal.

15. The base station of claim 14, wherein the digital unit further comprises a base station transmit signal mapper configured to map a base station transmit signal to the transmit beamformer input signal, and the base station transmit signal is a signal to be transmitted from the base station through a downlink to the terminal.

16. The base station of claim 9, wherein the distribution analog unit transmits the plurality of analog array transmit signals in a millimeter-wave (mmWave) band.

17. A terminal comprising:
an antenna configured to receive an analog receive signal based on a transmit beamforming input signal from a plurality of distributed antenna arrays;
a virtual terminal configured to restore the transmit beamforming input signal based on an amplitude of the analog receive signal; and
a terminal receive signal mapper configured to map the transmit beamforming input signal to a base station transmit signal,
wherein the base station transmit signal is generated to be transmitted from a base station through a downlink to the terminal, and
wherein the virtual terminal comprises:
an analog-to-digital (A/D) converter configured to convert the analog receive signal into a digital receive signal;
a receive signal divider configured to divide the digital receive signal into a data receive signal and a pilot receive signal;
a receive signal amplitude estimator configured to estimate the amplitude of the analog receive signal based on the pilot receive signal; and
a data signal restorer configured to restore the transmit beamforming input signal based on the amplitude of the analog receive signal and the data receive signal.

* * * * *